(12) United States Patent  (10) Patent No.: US 6,178,393 B1
Irvin  (45) Date of Patent:  Jan. 23, 2001

(54) PUMP STATION CONTROL SYSTEM AND METHOD

(76) Inventor: William A. Irvin, 245 Cokesbury Ct., Green Cove Springs, FL (US) 32043

( * ) Notice: Under 35 U.S.C. 154(b), the term of this patent shall be extended for 0 days.

(21) Appl. No.: 09/063,194

(22) Filed: Apr. 20, 1998

Related U.S. Application Data

(63) Continuation-in-part of application No. 08/518,190, filed on Aug. 23, 1995, now Pat. No. 5,742,500.

(51) Int. Cl.$^7$ ...................................................... G06G 7/48
(52) U.S. Cl. .................................. 703/10; 703/9; 700/29; 700/36; 700/282
(58) Field of Search ........................... 395/500.3, 500.31; 364/138, 156, 528.17, 149; 702/6, 45, 12; 703/9, 10; 700/29, 36, 281, 282, 9

(56) References Cited

U.S. PATENT DOCUMENTS

| | | |
|---|---|---|
| 3,610,779 | 10/1971 | Hubby . |
| 3,705,532 | 12/1972 | Hubby . |
| 3,744,932 | 7/1973 | Prevett . |

(List continued on next page.)

OTHER PUBLICATIONS

Hugh C. Card and Richard Jamieson, Water & Energy— KBEMS: A System for Monetary Savings from SCADA Information and Much More, pp. 2–5, Drinking Water Research, vol. 5, No. 2, Mar./Apr. 1995.

William A. Irvin (inventor of instant application) *Section 1700—Pump Control Systems*, Proposal sent to Summit County, Ohio on Oct. 25, 1994.

Homce et al., "Reducing Unscheduled Plant Maintenance Delay; Field Test of a New Method to Predict Electric Motor Failure", IEEE Cement Industry Tech. Conf. pp. 49–60. Jun. 1995.*

Farag et al., "An integrated On–Line Motor Protection System", IEEE Industry Applications Magazine, vol. 2, Issue 2, pp. 21–26, Mar.–Apr. 1996.*

Schoen et al., "An Unsupervised, On–line System for Induction Motor Fault Detection Using Stator Current Monitoring", IEEE Industry App. Soc. Ann. Meeting, vol. 1, pp. 103–109, Oct. 1994.*

Clapp et al., "Computer Simulation of a Motor–pump Unit to Aid in Interpreting Vibration Data", IEEE Conf. Proc. Southeastcon '88, pp. 244–247, Apr. 1988.*

*Primary Examiner*—Kevin J. Teska
*Assistant Examiner*—Douglas W. Sergent
(74) *Attorney, Agent, or Firm*—Allen, Dyer, Doppelt, Milbrath & Gilchrist, P.A.

(57) ABSTRACT

The pump station control system and method monitors and displays a time history of the operating parameters of a pump station. Sensed operating parameters are transmitted to an operator in real time and are stored at predetermined time intervals over a predetermined period of time. A real-time cost parameter of the system is calculated that provides a measure of the cost per throughput of the material being pumped. The system can be optimized for the cost parameter by controlling system variables such as pump speed in response to the level of fluid.

8 Claims, 41 Drawing Sheets

U.S. PATENT DOCUMENTS

| | | | |
|---|---|---|---|
| 4,108,574 | 8/1978 | Bartley et al. | |
| 4,120,033 | 10/1978 | Corso et al. | |
| 4,178,132 | 12/1979 | Shiraishi et al. | |
| 4,258,421 | 3/1981 | Juhasz et al. | |
| 4,330,237 | 5/1982 | Battah | |
| 4,334,425 | 6/1982 | Crane | |
| 4,370,098 | 1/1983 | McClain et al. | |
| 4,437,811 | 3/1984 | Iwata et al. | |
| 4,444,545 | 4/1984 | Sanders et al. | |
| 4,459,671 | 7/1984 | Teass et al. | |
| 4,475,380 | 10/1984 | Colovas et al. | |
| 4,486,148 | 12/1984 | Battah | |
| 4,584,654 | 4/1986 | Crane | |
| 4,642,992 | 2/1987 | Julovich | |
| 4,803,039 | 2/1989 | Impink, Jr. et al. | |
| 4,805,118 | 2/1989 | Rishel | |
| 4,835,687 | 5/1989 | Martin | |
| 4,843,575 | 6/1989 | Crane | |
| 4,916,628 | 4/1990 | Kugler | |
| 4,945,491 | 7/1990 | Rishel | |
| 4,999,117 | 3/1991 | Palmu et al. | |
| 5,092,739 | 3/1992 | Gill | |
| 5,121,318 | 6/1992 | Lipner et al. | |
| 5,240,380 | 8/1993 | Mabe | |
| 5,287,875 * | 2/1994 | Otani | 700/281 |
| 5,320,425 * | 6/1994 | Stephenson et al. | 366/1 |
| 5,386,360 | 1/1995 | Wilson et al. | |
| 5,418,710 * | 5/1995 | Ono et al. | 395/500.23 |
| 5,455,780 * | 10/1995 | Nguyen et al. | 395/500.33 |
| 5,487,621 * | 1/1996 | Takada et al. | 405/80 |
| 5,563,351 * | 10/1996 | Miller | 73/861.42 |
| 5,587,926 * | 12/1996 | Chiu et al. | 702/45 |
| 5,628,229 * | 5/1997 | Krone et al. | 702/45 |
| 5,742,500 * | 4/1998 | Irvin | 364/138 |
| 5,812,421 * | 9/1998 | Fujii et al. | 364/138 |

* cited by examiner

SYSTEM ALARM LOG

| TRIGGERED | | | | PREVIOUS SCREEN | MAIN SCREEN | MAIN MENU |
|---|---|---|---|---|---|---|
| TIME: | DATE: | ALARM DESCRIPTION | ALARM ACKNOWLEDGED: | ALARM RESET: | | |
| 4:15 | 3/17/97 | PUMP 4 SEAL WATER FAIL | 4:16 | | | |
| 17:27 | 3/15/97 | PUMP 2 VFD FAULT | 17:30 | 19:20 | | |

CURRENT TIME: 4:21 PM   MOVE CURSOR  MOVE CURSOR  ACK     ALARM-CURSOR
                        ONE POSITION  1/2 PAGE     ALARM   ENABLE DISABLE
TODAY'S DATE: 3/17/97

| PUMP 2 STATUS | | PREVIOUS | MAIN SCRN | MAIN MENU | ALARM LOG |
|---|---|---|---|---|---|

ELECTRIC HP = 84.7 / KW = 63.2
0 TO 500 HP / 0 TO 373 KW

PUMP SPEED = 84.2 % / RPM = 1452 — 63
0 TO 100% / 0 TO 1725 RPM

SYSTEM OUTFLOW 3075 GPM / 4.43 MGD
0 TO 10000 GPM

VFD AIR INTAKE TEMP. = 102 DEGREE F — 64
32 TO 212 DEGREE FAHRENHEIT

ER=EXTERNAL  AR=AUTOMATIC,  SR=SCREEN RESET
PUMP OPERATION ALARMS PRESS ONCE TO ACKNOWLEDGE TWICE TO RESET — 65

| | | |
|---|---|---|
| ⇨ DISABLED | ER OVERLOAD TRIPPED | SR WINDINGS OVERTEMP |
| MANUAL | AR POWER MONITOR TRIPPED | SR UPPER BEARING OVERTEMP |
| OFF | ER REMOTE LOCKOUT | SR LOWER BEARING OVERTEMP |
| ⇨ AUTO | ER LOCAL LOCKOUT | AR SEAL WATER FAIL |
| ⇨ CALLED VFD | ER VFD 1 FAULT | AR VFD HIGH TEMP |
| CALLED BYPASS | SR FAIL VFD LO RUN VERIFY | SR VFD HIGH TEMP SHUTDOWN |
| ⇨ RUN VFD | SR FAIL VFD HI RUN VERIFY | AR TEMP XMITTER FAIL |
| RUN BYPASS | SR FAIL BYPASS RUN VERIFY | AR MEGGER TRIP |
| ⇨ HIGH RUN VERIFIED | AR POWER XMITTER FAILAR | VFD LOSS OF SURGE PROT. |
| LOW RUN VERIFIED | AR LOW LEVEL LOCKOUT | AR HI VIBRATION WARNING |
| R RUN TIME = 99999.95 | AR MOISTURE IN MOTOR | SR HI VIBRATION SHUTDOWN — 66 |

| DAILY FLOW ENERGY HISTORY | | PREVIOUS SCREEN | MAIN SCREEN | MAIN MENU | ALARM LOG |
|---|---|---|---|---|---|
| PERIOD | MILLIONS GALLONS PUMPED | ENERGY COST DAILY | AVERAGE COST PER MILLION GALLONS | DAILY × 365 = YEARLY COST | |
| TODAY TO NOW | 0.000 | $00.00 | $00.00 | $00,000 | |
| SUNDAY | 1.225 | $64.32 | $51.25 | $23,476 | |
| MONDAY | 1.249 | $64.14 | $52.15 | $23,774 | |
| TUESDAY | 1.245 | $66.17 | $53.15 | $24,153 | |
| WEDNESDAY | 1.255 | $65.32 | $52.05 | $23,843 | |
| THURSDAY | 1.242 | $65.25 | $52.75 | $23,913 | |
| FRIDAY | 1.253 | $89.99 | $71.82 | $32,847 | |
| SATURDAY | 1.259 | $94.74 | $75.52 | $34,580 | |
| TOTAL | 8.758 | $511.19 | | | |
| AVERAGE | 1.246 | $72.85 | | | |

DAY ENDS 12:00 MIDNIGHT
"TODAY TO NOW" DATA NOT INCLUDED IN "AVERAGE" OR "TOTAL"

| NOW | WEEKLY | MONTHLY | YEARLY |
|---|---|---|---|

*FIG. 9(a).*

| wk-hstr.fil | | 5x7 | 23K of 4K bytes (8K) | PREVIOUS SCREEN | MAIN SCREEN | MAIN MENU | PRINT UTILITIES ALARM LOG |
|---|---|---|---|---|---|---|---|

WEEKLY FLOW ENERGY HISTORY

| PERIOD | MILLIONS GALLONS PUMPED | ENERGY COST WEEKLY | AVERAGE COST PER MILLION GALLONS | WEEKLY X 52 = YEARLY COST |
|---|---|---|---|---|
| THIS WEEK TO NOW | 8.429 | 213.68 | 25.35 | 11,111.36 |
| WEEK 1 | 16.446 | 404.40 | 24.59 | 21,028.80 |
| WEEK 2 | 16.189 | 396.79 | 24.51 | 20,633.20 |
| WEEK 3 | 15.432 | 370.06 | 23.98 | 19,243.09 |
| WEEK 4 | 14.049 | 335.77 | 23.90 | 17,430.10 |
| WEEK 5 | 18.711 | 445.88 | 23.83 | 23,185.92 |
| WEEK 6 | 18.657 | 443.10 | 23.75 | 23,041.40 |
| WEEK 7 | 19.732 | 459.12 | 23.70 | 23,874.05 |
| WEEK 8 | 14.901 | 351.96 | 23.62 | 18,302.00 |
| WEEK 9 | 12.551 | 296.33 | 23.61 | 15,409.11 |

WEEK ENDS SATURDAY 12:00 MIDNIGHT

WEEK 1 = LAST WEEK

| NOW | DAILY | MONTHLY | YEARLY |
|---|---|---|---|

FIG. 9(b).

| mth-hstr.fil | | 5x7 | 23K of 4K bytes (8K) | PREVIOUS SCREEN | MAIN SCREEN | PRINT UTILITIES MAIN MENU | ALARM LOG |

MONTHLY FLOW ENERGY HISTORY

| PERIOD | MILLIONS GALLONS PUMPED | ENERGY COST MONTHLY | AVERAGE COST PER MILLION GALLONS | MONTHLY X 12 = YEARLY COST |
|---|---|---|---|---|
| MONTH TO NOW | 75.234 | 1,846.99 | 24.55 | 22,163.94 |
| JANUARY | 143.256 | 3,326.40 | 23.22 | 39,916.85 |
| FEBRUARY | 146.712 | 3,463.87 | 23.61 | 41,566.44 |
| MARCH | 147.011 | 3,235.71 | 22.01 | 38,828.55 |
| APRIL | 149.661 | 2,963.29 | 19.80 | 35,559.45 |
| MAY | 150.132 | 2,851.01 | 18.99 | 34,212.08 |
| JUNE | 152.051 | 2,785.57 | 18.32 | 33,426.89 |
| JULY | 145.556 | 2,510.84 | 17.50 | 30,130.09 |
| AUGUST | 143.579 | 2,410.69 | 16.79 | 28,928.29 |
| SEPTEMBER | 140.720 | 2,143.17 | 15.23 | 25,717.99 |
| OCTOBER | 139.009 | 2,107.37 | 15.16 | 25,288.52 |
| NOVEMBER | 144.541 | 2,197.02 | 15.20 | 26,364.28 |
| DECEMBER | 144.066 | 2,188.36 | 15.19 | 26,260.35 |
| TOTAL | 1,746.294 | 32,183.88 | | |

"MONTH TO NOW" NOT INCLUDED IN TOTAL.

| NOW | DAILY | WEEKLY | YEARLY |

FIG. 9(c).

YEARLY FLOW ENERGY HISTORY

| PERIOD | MILLIONS GALLONS PUMPED | AVERAGE COST PER MILLION GALLONS | ENERGY COST YEARLY |
|---|---|---|---|
| 0000 TO NOW | 000.00 | $00.00 | $00,000 |
| YEAR 10 | 872.13 | $55.25 | $48,185 |
| YEAR 9 | 866.25 | $57.52 | $49,826 |
| YEAR 8 | 864.22 | $56.76 | $49,049 |
| YEAR 7 | 862.13 | $55.12 | $47,520 |
| YEAR 6 | 859.13 | $54.23 | $46,588 |
| YEAR 5 | 855.76 | $53.25 | $45,569 |
| YEAR 4 | 850.63 | $58.35 | $49,634 |
| YEAR 3 | 842.26 | $55.25 | $46,535 |
| YEAR 2 | 835.13 | $53.05 | $44,303 |
| YEAR 1 | 829.30 | $53.05 | $43,853 |

PREVIOUS SCREEN | MAIN SCREEN | MAIN MENU | ALARM LOG

NOW | DAILY | WEEKLY | MONTHLY

*FIG. 9(d).*

| PUMP SET-UP PARAMETERS | PREVIOUS SCREEN | MAIN SCREEN | MAIN MENU | ALARM LOG |
|---|---|---|---|---|

| PRESENT WETWELL LEVEL IS 0.00' | HIGH LEVEL ALARM AT 9.00 FEET |
| | LOW LEVEL ALARM AT 1.00 FEET |

PRESENT PUMP SPEED IS 0.00%

| LEAD SETTINGS - 1 PUMP RUN | |
|---|---|
| START LEVEL (VFD) | 2.50 FEET |
| MINIMUM SPEED | 60.00 % |
| REACH MAX SPEED AT | 3.00 FEET |
| MAXIMUM SPEED | 100.00 % |
| START LEVEL BYPASS | 3.50 FEET |
| STOP LEVEL | 2.00 FEET |
| LAG-1 SETTINGS - 2 PUMPS RUN | |
| START LEVEL (VFD) | 3.50 FEET |
| MINIMUM SPEED | 70.00 % |
| REACH MAX SPEED AT | 3.75 FEET |
| MAXIMUM SPEED | 100.00 % |
| START LEVEL BYPASS | 4.50 FEET |
| STOP LEVEL | 3.25 FEET |
| LAG-2 SETTINGS - 3 PUMPS RUN | |
| START LEVEL (VFD) | 5.50 FEET |
| MINIMUM SPEED | 80.00 % |
| REACH MAX SPEED AT | 6.00 FEET |
| MAXIMUM SPEED | 100.00 % |
| START LEVEL BYPASS | 7.00 FEET |
| STOP LEVEL | 5.00 FEET |
| LAG-3 SETTINGS - 4 PUMPS RUN | |
| START LEVEL (VFD) | 8.00 FEET |
| MINIMUM SPEED | 90.00 % |
| REACH MAX SPEED AT | 8.50 FEET |
| MAXIMUM SPEED | 100.00 % |
| START LEVEL BYPASS | 9.00 FEET |
| STOP LEVEL | 7.50 FEET |

CONTROL SYSTEM SETUP

| PREVIOUS SCREEN | MAIN SCREEN | SETUP MENU | ALARM LOG |

5. TEMPERATURE ALARMS:
   a. HIGH TEMPERATURE ALARM WARNING AT ☐ 0 DEGREE FAHRENHEIT.
   b. HIGH TEMPERATURE, VFD SHUTDOWN AT ☐ 0 DEGREE FAHRENHEIT.

6. THE FLOW SENSOR IS CALIBRATED FOR 0 TO ☐ 0 GPM (GALLONS PER MINUTE).

7. ENABLE PRINTER OPTION ▨ YES, ☐ NO

| RETURN | PAGE 2 OF 2 | CANCEL | ENTER |

*FIG. 15(b).*

| PREVIOUS SCREEN | MAIN SCREEN | SETUP MENU | ALARM LOG |

PUMP SETUP PARAMETERS

1. HIGH LEVEL ALARM AT ☐ 9.00 FEET
2. LOW LEVEL ALARM AT ☐ 1.00 FEET (RESET AT STOP PUMPS LEVEL).
3. STOP PUMPS AT LOW LEVEL ALARM WHILE OPERATION IN MAN. MODE- ▨ YES, ☐ NO
4. LEAD PUMP SETUP:
   a. STOP PUMP AT ☐ 2.00 FEET.
   b. START VFD AT ☐ 2.50 FEET, AT THE MINIMUM SPEED OF ☐ 60.00% AS THE LEVEL REACHES ☐ 3.00 FEET.
   c. INCREASE SPEED TO ☐ 100.00% AS THE LEVEL REACHES ☐ 3.00 FEET.
   d. START ACL (BYPASS) AT ☐ 3.50 FEET, IF NO HIGH RUN VERIFICATION
5. LAG-1 PUMP SETUP:
   a. STOP PUMP AT ☐ 3.25 FEET.
   b. START VFD AT ☐ 3.50 FEET, AT THE MINIMUM SPEED OF ☐ 70.00% AS THE LEVEL REACHES ☐ 3.75 FEET.
   c. INCREASE SPEED TO ☐ 100.00% AS THE LEVEL REACHES ☐ 3.75 FEET.
   d. START ACL (BYPASS) AT ☐ 4.50 FEET, IF NO HIGH RUN VERIFICATION

| CONTINUE | PAGE 1 OF 2 | CANCEL | ENTER |

BUBBLER AIR SUPPLY SETUP

1. AIR COMPRESSOR ALTERNATION (CHOOSE ONE):

☐ a. UNEVEN ALTERNATION
   (A/C #1 RUNTIME = 4 HOURS, A/C #2 RUNTIME = 1 HOUR)

☐ b. EVEN ALTERNATION
   (A/C #1 RUNTIME = 4 HOURS, A/C #2 RUNTIME = 4 HOURS)

☐ c. MANUAL ALTERNATION
   THE PRIMARY A/C IS: ☐ #1  ☐ #2
   THE PRIMARY A/C IS: ☐ #2  ☐ #1

2. IS THE BUBBLER TUBE BLOWDOWN OPTION AVAILABLE ▨ YES, ☐ NO a. IF AVAILABLE, ENABLE AUTO BLOWDOWN: ▨ YES, ☐ NO
   b. BLOWDOWN AUTOMATICALLY EVERY ☐ 0 HOURS.

[PREVIOUS SCREEN] [MAIN SCREEN] [SETUP MENU] [ALARM LOG]

[CANCEL] [ENTER]

FIG. 18.

ENCLOSURE AIR SETUP

| PREVIOUS SCREEN | MAIN SCREEN | SETUP MENU | ALARM LOG |

1. BLOWER ALTERNATION (CHOOSE ONE):
   a. UNEVEN ALTERNATION (EVERY 4 HOURS RUN THE STANDBY BLOWER FOR ONE HOUR)- ▨ YES
   b. EVEN ALTERNATION (ALTERNATE EVEY 4 HOURS)- ☐ YES
   c. MANUAL ALTERNATION- ☐ YES   NORMAL= ▨ #1  ☐ #2
                                   STANDBY= ☐ #1  ▨ #2

2. CFM ALARM (CLOSE DOORS) :
   a. LOW AIR FLOW ALARM AT OR BELOW ☐ 0 CFM (BASED ON HIGH SPEED OPERATION).  SOFT ALARM AFTER ONE HOUR.

3. CABINET PRESSURE ALARM (CLOSE DOORS) :
   a. LOW CABINET PRESSURE AT OR BELOW ☐ 0.00 INCHES H20 (BASED ON LOW SPEEED OPERATION).  SOFT ALARM AFTER ONE HOUR.

4. RUN BLOWER HIGH SPEED IF TEMP. RISES ABOVE ☐ 0 DEGREE FAHRENHEIT.

| CANCEL | ENTER |

*FIG. 19.*

AUTO WIPE DOWN SETUP

1. ENABLE WET WELL FLUSH: ▨YES, ☐NO
2. ENABLE EFFLUENT PIPE PURGE: ▨YES, ☐NO
3. PUMP WELL DOWN TO ☐ 0.00 FEET (FLUSH LEVEL).
4. HOLD FLUSH LEVEL FOR ☐ 0 MINUTES.
5. USE ☐ 0 PUMP(S) IN VFD MODE AT ☐ 0.00% SPEED TO PURGE THE PIPE.
6. ALLOW THE WET WELL TO RISE TO ☐ 0.00 FEET, BEFORE PURGING THE PIPE.
7. ACTIVATE EVERY ☐ 0 DAY(S); DURING THE ☐ 0 HOUR OF THE DAY (0-23).

PREVIOUS SCREEN | MAIN SCREEN | SETUP MENU | ALARM LOG

CANCEL | ENTER

FIG. 21.

PASSWORD PROTECTION SETUP

4. PASSWORD PROTECT:

| | | | |
|---|---|---|---|
| a. THE LEVEL SETUP SCREEN | YES, | NO | USE PW LEVEL ☐ 0 |
| b. THE PUMP SETUP SCREEN | YES, | NO | USE PW LEVEL ☐ 0 |
| c. THE BUBBLER SETUP SCREEN | YES, | NO | USE PW LEVEL ☐ 0 |
| d. THE ENCLOSURE AIR SETUP SCREEN | YES, | NO | USE PW LEVEL ☐ 0 |
| e. THE WIPEDOWN SETUP SCREEN | YES, | NO | USE PW LEVEL ☐ 0 |
| f. THE PASSWORD SETUP SCREEN | YES, | NO | USE PW LEVEL ☐ 0 |
| g. THE TIME & DATE SETUP SCREEN | YES, | NO | USE PW LEVEL ☐ 0 |
| h. THE CONTROL SYSTEM SETUP SCREEN | YES, | NO | USE PW LEVEL ☐ 0 |
| i. THE GENERATOR SETUP SCREEN | YES, | NO | USE PW LEVEL ☐ 0 |
| j. THE ALARM SETUP SCREEN | YES, | NO | USE PW LEVEL ☐ 0 |
| k. THE PUMP ALTERNATION SETUP SCREEN | YES, | NO | USE PW LEVEL ☐ 0 |

[PREVIOUS SCREEN] [MAIN SCREEN] [SETUP MENU] [ALARM LOG]

[CANCEL] [ENTER]

[CONTINUE]    PAGE 1 OF 2

FIG. 22(a).

PUMP ALTERNATION SETUP

1. ALTERNATION:
   a. ▨ MANUAL    ☐ AUTOMATIC
   b. IF MANUAL, THE PUMP SEQUENCE SHALL BE:
      LEAD = ☐ 0   LAG 1 = ☐ 0   LAG 2 = ☐ 0   LAG 3 = ☐ 0
   c. IF AUTOMATIC, THE PUMPS WILL ALTERNATE (CHOOSE ONE):
      (1) AT STOP PUMP LEVEL- ▨ YES, TIME 1= ☐ 0.00 TIME 2= ☐ 0.00
      (2) AT TIME OF DAY- ☐ YES,
      (3) EVERY ☐ 0 HOURS,
      (4) EVERY ☐ 0 HOURS ORSTOP PUMPS WHICHEVER COMES FIRST- ☐ YES
   d. TYPE AUTOMATIC ALTERNATION:
      (1) FOFO (FIRST ON FIRST OFF)- ▨ YES,
      (2) LOFO (LAST ON FIRST OFF)- ☐ YES

[Buttons: PREVIOUS SCREEN | MAIN SCREEN | SETUP MENU | ALARM LOG]
[Buttons: CANCEL | ENTER]

EXAMPLE OF POTENTIAL SAVINGS WITH NO STATIC - (100% DYNAMIC HEAD) (NOT A REAL WORLD SITUATION)

PUMP 10"ID PIPE 4000 FT LONG

C=130
STATIC HEAD=0 FT
ELECTRIC RATE=.08/KWH

INFLOW= 500 GPW (CONSTANT)
START PUMP
GRADE 5'-0"
5'-0"
STOP PUMP
WET WELL

| OPTION A (CONSTANT SPEED OPERATION) | OPTION B (VARIABLE SPEED OPERATION) |
|---|---|
| PUMP AT 1500 GPM | PUMP AT 500 GPM CONTINUOUSLY |
| OVERALL EFFICIENCY=55% | OVERALL EFFICIENCY=50% |
| DYHD=$\frac{.002083(4000)(100/130)^{1.85}(1500)^{1.85}}{4.8655}$ | DYHD=$\frac{.002083(4000)(100/130)^{1.85}(500)^{1.85}}{4.8655}$ |
| =52.51 FT | =6.88 FT |
| HHP=.002521(1500 GPM)(0+52.51 FT) =19.86 | HHP=.002521(500 GPM)(0+6.88 FT) =.87 |
| BHP=19.86/.55=36.1 HP | BHP=.87/.50=1.73 HP |
| ANNUAL OPERATING COST | ANNUAL OPERATING COST |
| [36.1 x .746 KW][$\frac{24}{3}$ x 365](.08) | [1.73 x .746 KW][$\frac{24}{1}$ x 365](.08) |
| =$6,290.85 | =$904.03 |
| *1HP-.746 KW | |

ANNUAL ENERGY COST
1500 GPM CONSTANT SPEED ENERGY COST   6,290.99
500 GPM CONSTANT SPEED ENERGY COST     904.44
                                    $5,386.55 (85.6%)

SUMMARY OF FORMULAS

GIVEN:
DYHD = DYNAMIC PIPE FRICTION HEAD (FEET)
L = PIPE LENGTH IN FEET
FLOW = MEASURED IN GALLONS PER MINUTE (GPM)
d = PIPE I.D. IN INCHES
HHP = HYDRAULIC HORSEPOWER
BHP = BRAKE HORSEPOWER

TOTAL HEAD = STATIC + DYNAMIC HEAD (IN FEET)
OVERALL EFFICIENCY = PUMP EFFICIENCY x MOTOR EFFICIENCY
HAZEN-WILLIAMS FORMULA FOR DISCHARGE OF PIPE FRICTION (EXPONENT=1.85)
c = PIPE FRICTION CO-EFFICIENT (TYPICALLY 100 TO 140)

AFFINITY LAWS:

$$\frac{FLOW_1}{FLOW_2} = \frac{RPM_1}{RPM_2} \quad \frac{PRES_1}{PRES_2} = \left(\frac{RPM_1}{RPM_2}\right)^2 \quad \frac{HP_1}{HP_2} = \left(\frac{RPM_1}{RPM_2}\right)^3$$

FORMULAS:

(1) $DYHD = .002083 \times L \times \dfrac{\left(\frac{100}{C}\right)^{1.85} \times (FLOW)^{1.85}}{d^{4.8655}}$ (2) $HHP = (.0002521) \times (FLOW) \times (TOTAL\ HEAD)$
$= (.0002521) \times (FLOW) \times (STATIC + DYNAMIC\ HEAD)$ $= (.0002521) \times (FLOW) \times \left[STATIC + \dfrac{.002083 \times L \times \left(\frac{100}{C}\right)^{1.85} \times (FLOW)^{1.85}}{d^{4.8655}}\right]$ (3) $BHP = \dfrac{HHP}{OVERALL\ EFFICIENCY}$ TYPICALLY $\dfrac{HHP}{.55}$

NOTE #1
GENERAL (REFERENCE #2, #3 ABOVE)
$BHP = K \times (FLOW)^{2.85} + K' \times (FLOW)$

NOTE #2
BHP IS PROPORTIONAL TO THE 3rd POWER (I.E., 2.85) OF FLOW

NOTE #3
TYPICAL VFD EFFICIENCY = 95%

*FIG. 26(b).*

PUMP STATION CONTROL SYSTEM AND METHOD

BACKGROUND OF THE INVENTION

Cross-Reference to Related Application

This application is a continuation-in-part of application "Pump Station Control System and Method," Ser. No. 08/518,190, filed Aug. 23, 1995, now U.S. Pat. No. 5,742,500.

FIELD OF THE INVENTION

The present invention relates to the pumping of liquids, and, more particularly, to control systems and methods for pumping wastewater.

DESCRIPTION OF RELATED ART

In a typical fluid-pumping application the goal is to maintain the quantity of fluid in a vessel. One or more pumps are used to compensate for inflows or outflows caused by events external to the system, and these pumps are selectively activated and controlled to maintain the state of the system within a predetermined range.

In the example of a wastewater lift station, wastewater flows into a wet well from sources such as residences, roadway drains, or other lift stations. One or more pumps remove water from the wet well as necessary to maintain the level within predetermined limits. Transducers can measure wet-well level, wet-well outflow from or inflow to each pump, flow through inlet or outlet pipes shared by multiple pumps, power input to the system or to individual pump motors, and other operating parameters. There may be one or more check valves in parallel or in series with each pump. When the station includes multiple pumps, they are usually in a parallel orientation.

The transducers and pump motors are connected to a pump station control system, which includes motor starters for starting and stopping the motors in response to operating conditions. The control system also includes alarms, displays, logic circuitry ranging from relays to microprocessors, and disk drives and/or semiconductor memory for storing data and programs. The control system can also include means for communicating, such as by radio or land-line telemetry, with a remote monitoring system. The information to be communicated can include data or calculated parameters that characterize the operating conditions of the lift station, desired control parameters, alarms, and desired changes in the program to control the system.

The control apparatus and methods used in pumping stations are generally focused on maintaining desired operating conditions reliably, but without specifically addressing or even calculating operating efficiencies and/or costs. For example, in a typical wastewater lift station one pump is turned on when the water in the wet well reaches a preset "pump start" level and is turned off at a preset (lower) "pump stop" level. If the pump has a variable-speed drive, the pump is initially activated at a preset "start speed" that is less than 100% of the pump's rated speed. The pumps, control levels, and control speeds are usually chosen such that the starting pump outflow exceeds the average inflow, and therefore the wet-well level begins to fall as soon as the pump is activated. The typical operating pattern thus includes intermittent pump operation, with the wet-well level cycling between the "pump start" and the "pump stop" levels. In this operating mode the pump duty cycle increases or decreases with flow, but the number of pumps and pump speed are constant during each "on" portion of the cycle. At times of higher inflow, however, it may be desirable to increase outflow by increasing pump speed or activating additional pumps in parallel with the lead pump. For example, the lead pump outflow may simply be insufficient to keep up with the inflow. The system typically detects this condition because the wet-well level continues to rise even after lead pump activation.

There are numerous methods for selecting the pump speed or pumps to be activated, which can dramatically affect pump station energy consumption, generally a major operating cost. In most lift stations, however, the control system does not even calculate an efficiency parameter. For example, in multipump systems the control system usually alternates between pumps for each on-off cycle.

In variable-speed systems pump speed is generally a linear function of level above the "pump start" level. While previously known systems calculate efficiency parameters, the methods do not effectively optimize efficiency.

In other art areas, computer-driven control systems and methods are known that monitor a plurality of operating parameters for the purpose of controlling some or all of these operating parameters to optimize a particular parameter, such as efficiency. Additionally, it is known to provide time histories of such parameters for maintenance and diagnostic purposes.

Such systems include those disclosed by Juhasz et al. (U.S. Pat. No. 4,258,421), directed to a vehicle monitoring and recording system; Teass et al. (U.S. Pat. No. 4,459,671), directed to a fuel management control system; Kugler (U.S. Pat. No. 4,916,628), directed to a control and status monitoring system for power generating stations; Crane (U.S. Pat. Nos. 4,843,575 and 4,334,425), directed to an interactive dynamic real-time management system for improving the operating efficiency of powered systems; Julovich (U.S. Pat. No. 4,642,992), directed to a method for maximizing the efficiency of cooling pumps in a power generating plant; Colovas et al. (U.S. Pat. No. 4,475,380), directed to a fuel efficiency monitor.

Systems specifically directed to fluid-flow control include those disclosed by Battah (U.S. Pat. Nos. 4,486,148 and 4,330,237), directed to a method of controlling a motive power and fluid driving system; and Bartley et al. (U.S. Pat. No. 4,108,574), Crane (U.S. Pat. No. 4,584,654), and Martin (U.S. Pat. No. 4,835,687), directed to monitoring and control of piping systems. Pump systems in particular are addressed by McClain et al. (U.S. Pat. No. 4,370,098), Shiraishi et al. (U.S. Pat. No. 4,178,132), Rishel (U.S. Pat. No. 4,805,118), Palmu et al. (U.S. Pat. No. 4,999,117), Mabe (U.S. Pat. No. 5,240,380), Gill (U.S. Pat. No. 5,092,739), Prevett (U.S. Pat. No. 3,744,932), and Corso et al. (U.S. Pat. No. 4,120,033).

Plant monitoring and control systems have been disclosed by Impink, Jr., et al. (U.S. Pat. No. 4,803,039); Lipner et al. (U.S. Pat. No. 5,121,318); and Wilson et al. (U.S. Pat. No. 5,386,360).

Two types of efficiency parameters have been known in the art: the power ratio and the material throughput per unit energy. All of the types of power ratio used thus far measure the rate of work output by the powered system and the power consumed by the system and taking the ratio thereof.

A longstanding practice in the wastewater pumping industry is to use the "wire-to-water efficiency" as a measure of the efficiency of a pumping system (Rishel '118, Corso '033). This term is defined as the (hydraulic horsepower output of the pump divided by the electric horsepower input to the pump motor) times 100. Since electric horsepower decreases with a decrease in pump speed, it has been assumed that energy costs would also decrease. Therefore, the wire-to-water efficiency has been deemed to be the best measure of energy efficiency and effective pump speed.

The fluid volume pumped per unit energy, the second type of efficiency parameter, comprises a measure of the throughput efficiency. Efficiency values are taught to be calculated and displayed in a pipeline system by Crane (U.S. Pat. No. 4,584,654).

SUMMARY OF THE INVENTION

It is an object of the present invention to provide a monitoring and control system and a method for interfacing between an operator and a pump station controller.

It is a further object to provide such a monitoring and control system and a method that include means for tracking a plurality of system parameters over a predetermined time period.

It is an additional object to provide such a monitoring and control system that includes a plurality of real-time information screens accessible by the operator.

It is another object to provide such a monitoring and control system and method that sense a plurality of system parameters, performs diagnostic checks, and issues alarms when determined to be necessary.

It is yet a further object to provide such a control system and method that include menu-driven programmable logic control that permits an operator to alter the system configuration.

It is also an object to provide a control system and method that enable the prediction and the optimization of a system parameter.

It is yet another object to provide a control system that minimizes the training needed for an operator.

It is a further object to provide a control system that improves efficiency and thus minimizes operating costs.

It is also an object to provide a control system that can monitor and manage pump station operations remotely.

It is another object to provide a control system that can monitor and manage the operations of a plurality of pump stations remotely.

These and other objects are attained by the system of the present invention, which is specifically directed to monitoring the operating parameters of a pump station that has a fluid pump. The system comprises means for sensing a plurality of operating parameters of the pump station. Such operating parameters may include such data as pump status (off/on), pump speed, and fluid quantity in a vessel. In addition, there are provided means for transmitting the operating parameters from the sensing means to an operator in real time. This feature permits the operator, whether on site or remote from the station, to be aware of all sensed parameters essentially instantaneously, such as a pump shutting off or an alarm being issued on an element of the station.

A further element of the system comprises means for storing the sensed operating parameters at predetermined time intervals over a predetermined period of time. Thus a time history of the system's operating parameters can be stored so that calculations may be performed to provide the operator with information such as pump cycles and amounts of fluid pumped over time. Also, in communication with the storing means, a means for displaying this time history is provided in order to present a digital or graphical representation of the operating parameters over a desired time range. As a particular example, for instance, if a pump station employs more than one pump, a graph of each pump's duty cycle could be displayed over, say, a month, providing an indication of the work performed by each pump.

The system in one embodiment may further comprise means for calculating a real-time cost parameter of the system from the sensed operating parameters. This cost parameter may take the form of energy usage per quantity of fluid pumped, which can then be translated into a monetary cost. Utilizing the time history already stored, a prediction of the cost parameter can be calculated over a predetermined period of time. For example, a calculation could be made of energy usage and cost associated therewith for the coming year.

A further embodiment of the system comprises means for predicting the failure of an element of the pump station. This prediction can be made from a correlation of the real-time operating parameters with the time history of the operating parameters and with predetermined derived operating parameters. For example, a pump failure may be predicted by examining the energy usage of that pump over time as compared with its output. If the pump's efficiency is seen to be dropping, this may be indicative of a problem with that pump, which can then be taken off line for preventive maintenance prior to a catastrophic failure.

Yet another embodiment of the system comprises means in communication with the storing means for changing a pump's selection priority (i.e., lead vs. lag) upon a comparison of the real-time operating parameters with predetermined acceptable ranges of operating parameters.

Another element of an embodiment of the system comprises means for calculating the real-time cost parameter over cyclic flows, as are typically experienced in wastewater and fresh-water pumping applications.

In addition to providing a real-time monitoring system, the present invention provides a control system for interfacing between an operator and a pump station. As above, the system comprises sensing and communicating means. In order to include the control aspect of this embodiment, however, means are also provided for the operator to communicate a control signal to the pump station to effect a change in an operating parameter.

As with the above embodiments, this control system further comprises means for calculating from the sensed parameters a real-time cost parameter of the system and means for displaying the cost parameter to the operator. In addition, the control system comprises means for calculating a potential optimized cost parameter from the sensed parameters and the real-time cost parameter. This optimized cost parameter could take the form of an energy cost, for instance. The system can then calculate and display to the operator a recommended change in an operating parameter needed to achieve the optimized cost parameter. In the case of an energy cost, for example, it might be recommended to pump more slowly, or to place on line an additional pump to save energy.

The present invention further comprises an interactive interface and display system for providing communication between an operator and a pump station. As above, the pump station is provided with a plurality of sensors for sensing a plurality of operating parameters. The system in this configuration comprises a processor, means for transmitting the operating parameters from the pump station to the processor, and means resident in the processor for performing real-time calculations on the operating parameters to provide an efficiency parameter. The system further comprises means in communication with the processor for storing time histories of the operating parameters at predetermined time intervals and of the efficiency parameter over a predetermined period of time. Finally, the system comprises visual display means in communication with the processor for displaying the operating parameters and the efficiency parameter in real time and for displaying the time histories of the operating parameters and efficiency variable.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 4 illustrates the system alarm log screen.

FIG. 6 illustrates a pump status screen.

FIGS. 9a–d illustrate flow and energy history screens for the following time periods: FIG. 9a, daily; FIG. 9b, weekly; FIG. 9c, monthly; and FIG. 9d yearly.

FIG. 12 illustrates a pump parameter setup screen.

Figure 15A:
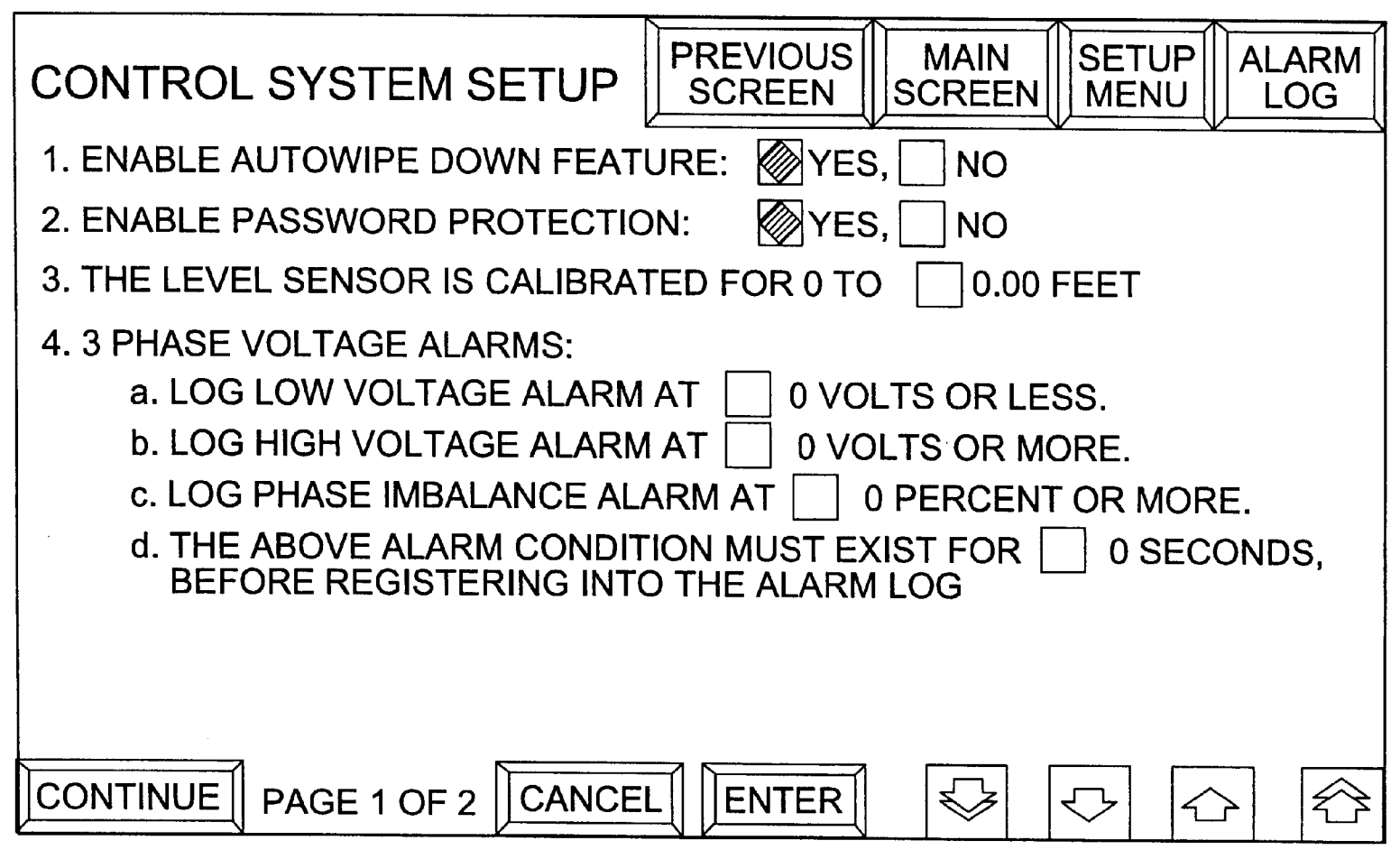

FIGS. 15a and 15b illustrate the first and the second screens of the control system setup option.

FIGS. 16a and 16b illustrate the first and the second screens of the pump parameters setup option from within the setup menu screen.

Figure 17A:
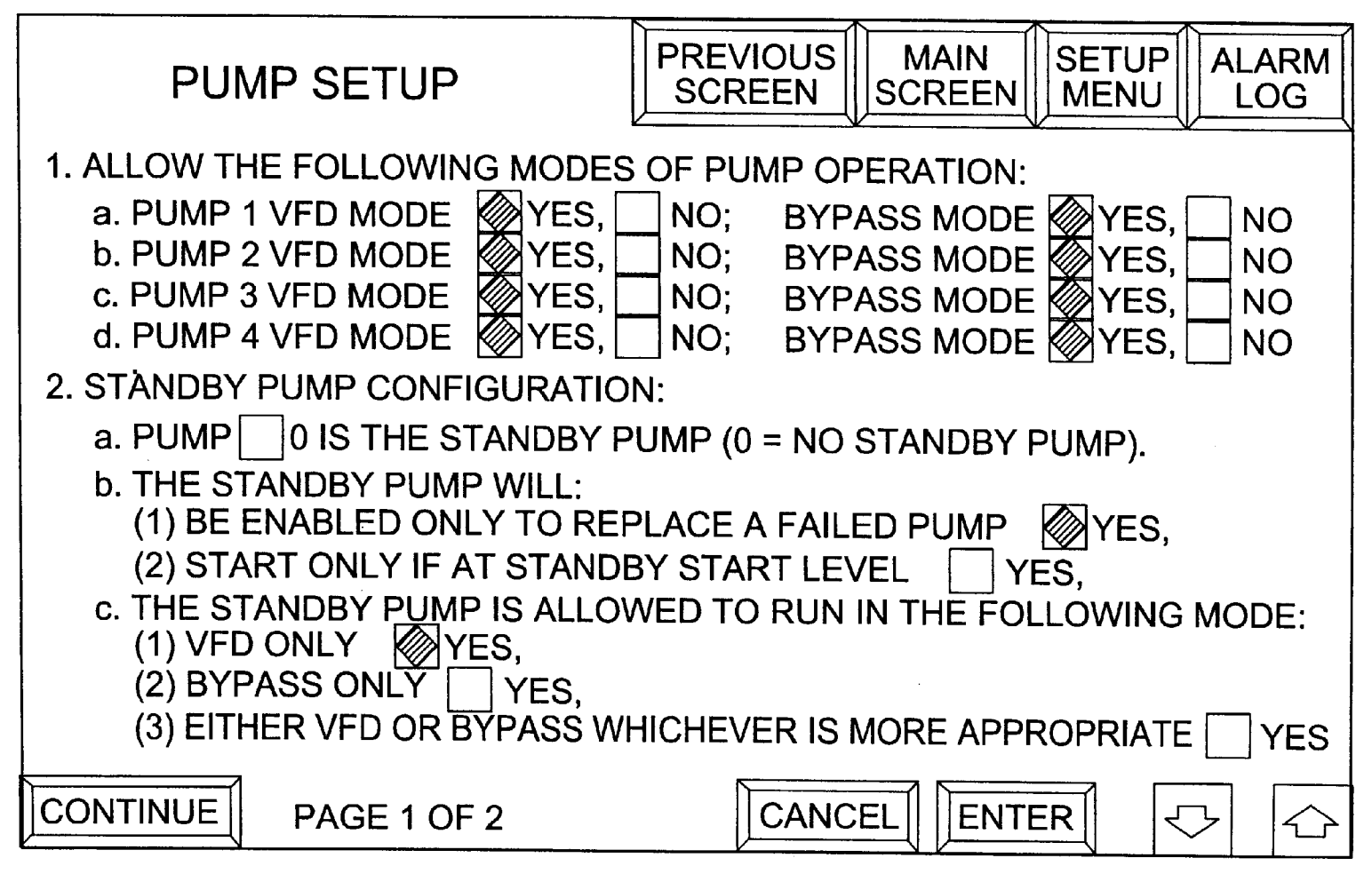

FIGS. 17a and 17b illustrate the first and the second screens of the pump setup option.

FIG. 18 illustrates the bubbler air supply setup screen.

FIG. 19 illustrates the enclosure air setup screen.

FIG. 21 illustrates the auto wipe-down setup screen.

FIGS. 22a and 22b illustrate the first and the second screens of the password protection setup option.

FIG. 24 illustrates the pump alternation setup screen.

FIG. 26a demonstrates a sample calculation of energy savings realizable with the system of the present invention;

FIG. 26b demonstrates a summary of the formulas used for the calculation.

FIG. 29a, having a single minimum; and having a secondary minimum (FIG. 29b) below and (FIG. 29c) above the global minimum.

(FIG. 30b) pump #2.

DETAILED DESCRIPTION OF THE PREFERRED EMBODIMENTS

A description of the preferred embodiments of the present invention will now be presented with reference to FIGS. 1–31.

Figure 1:
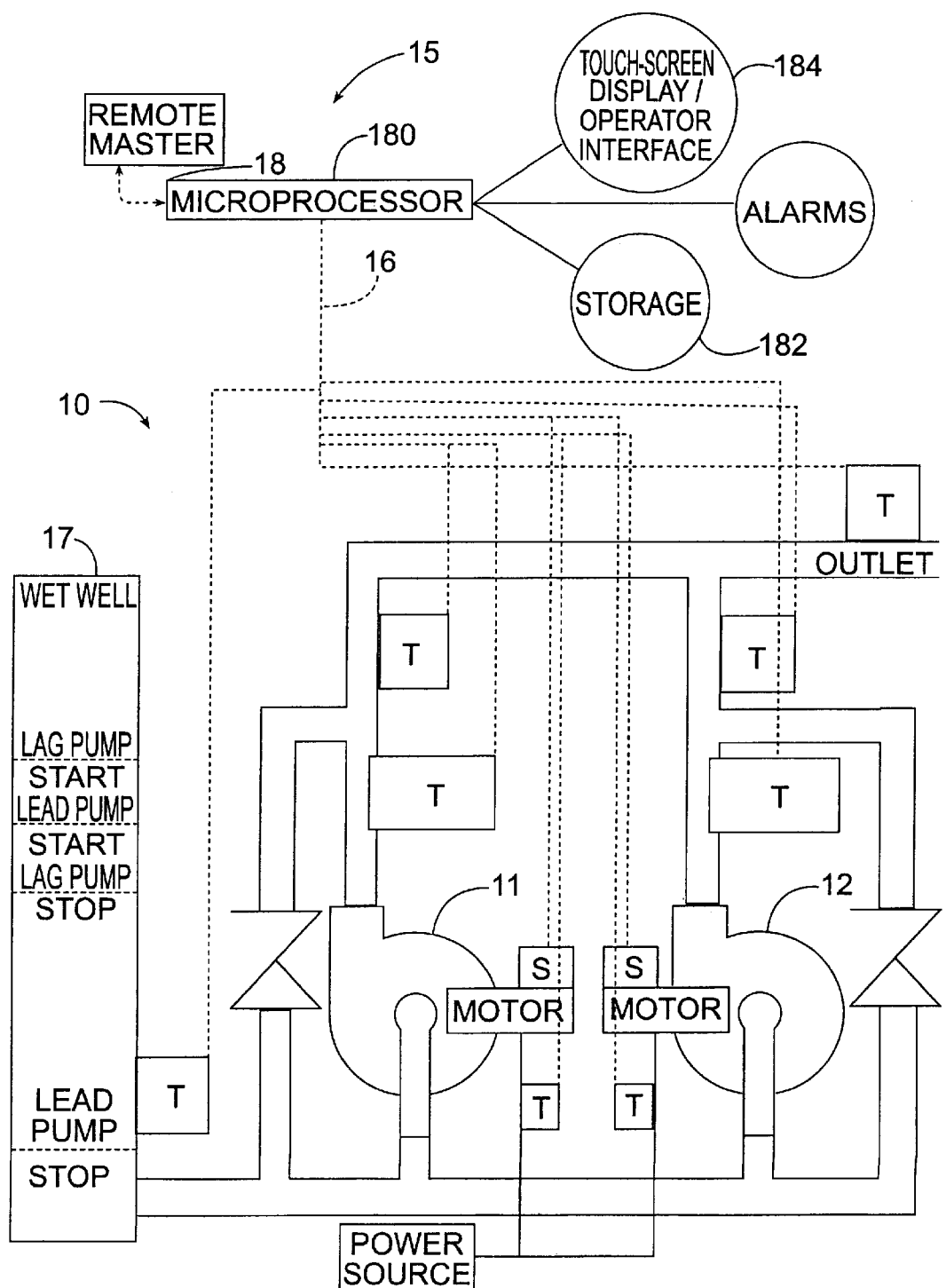
FIG. 1 is a block diagram of the system.

The preferred embodiment of the present system, a block diagram for which is shown in FIG. 1, is utilized to monitor and control up to four pumps, two of which, 11 and 12, are shown to be part of a municipal lift station for pumping wastewater. This application is not meant to be limiting, however, and the system is also adaptable for use with fresh water and for use with more or fewer pumps.

In FIG. 1, the "T" symbols represent transducers for measuring operating parameters, as discussed above. The "S" symbols adjacent each motor represent starters for the motors.

Figure 2:
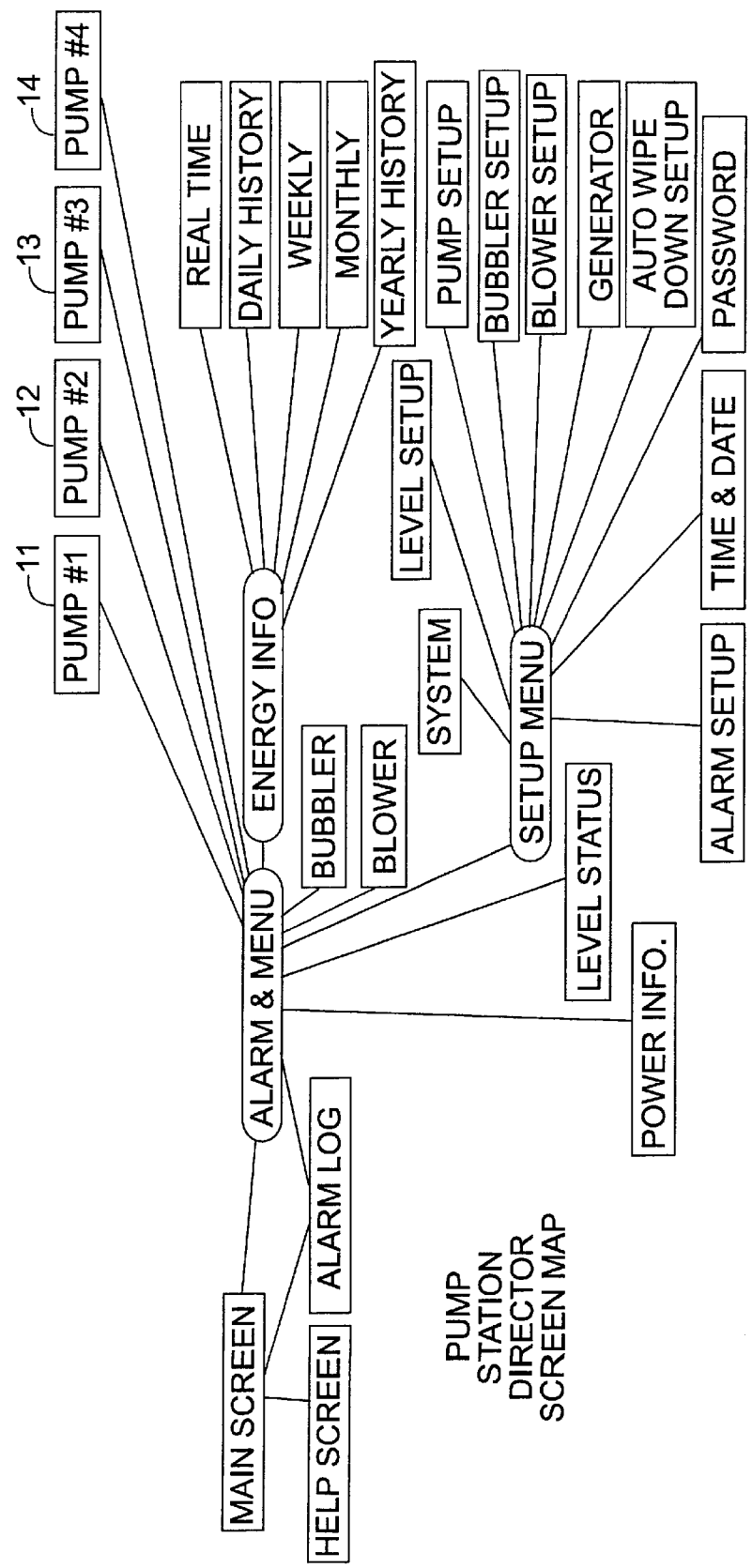
FIG. 2 is a map of the screens of the system.

The system, in both its monitoring and control aspects, is preferably screen based, and FIG. 2, showing a system with four pumps 11–14, is an exemplary map of illustrative system screens to be discussed herein.

The Monitoring System for a Pump Station

The system 15 of the present invention in one aspect is used to monitor the operating parameters of a pump station 10 having a pump, here four pumps 11–14, for pumping a liquid. The system 15 to be discussed herein is directed to a municipal lift station for pumping wastewater from a wet well 17, but is not intended to be limited thereto, and indeed the principles herein are applicable to any fluid pumping system.

The screens that are depicted in FIGS. 3–13 involve the monitoring portion of the system, which comprises means for sensing a plurality of operating parameters of the pump station 10. Such operating parameters may include, but are not limited to, data on such things as liquid level, energy usage, and pump status.

The system also includes means in communication with the sensing means for transmitting the operating parameters to an operator in real time. Such means may include, but are not limited to, cabling 16 such as fiber-optic cables.

Once the operating parameters have been sensed, as well as being transmitted to the operator, they are also communicated to a means for storing them at predetermined time intervals over a predetermined period of time. Such a storage means may include a computer 18 having a CPU 180 and storage device 182.

Means in communication with the storing means are also provided for displaying a time history of the operating parameters. Typically this entails a monitor screen 184 in communication with the computer 18. Monitor screen 184 in a preferred embodiment is a touch screen to facilitate movement between screens and minimize the training needed to utilize the system.

Referring to FIG. 2, the screen system map, one may see the relationships between the screens through which the operator is able to navigate to obtain the desired monitoring data and, as will be discussed in the following sections, to perform control and reconfiguration functions.

Previously disclosed systems have included high-information-content graphical displays at central monitoring locations, but such systems have been too expensive and difficult to use for individual lift stations. Moreover, these displays' information-carrying capacity far exceeded the information considered useful to a lift station operator. The current invention combines a high-information-content graphical display, an easy-to-use touch screen interface, and a new level of lift station hydraulic analysis and data history. The graphical interface represents a huge leap in information capacity, but new capacity confers advantage only with a clear vision for advantageous new content, and for a new interface that allows the operator to master easily the enriched control options. Thus this combination provides unique and surprising improvements in the scope of operating information and capacity for effective control available to lift station operators. The display, interface, and energy management improvements are integrally related. The key advantages of the present invention are a function of the combined improvements.

Figure 3:
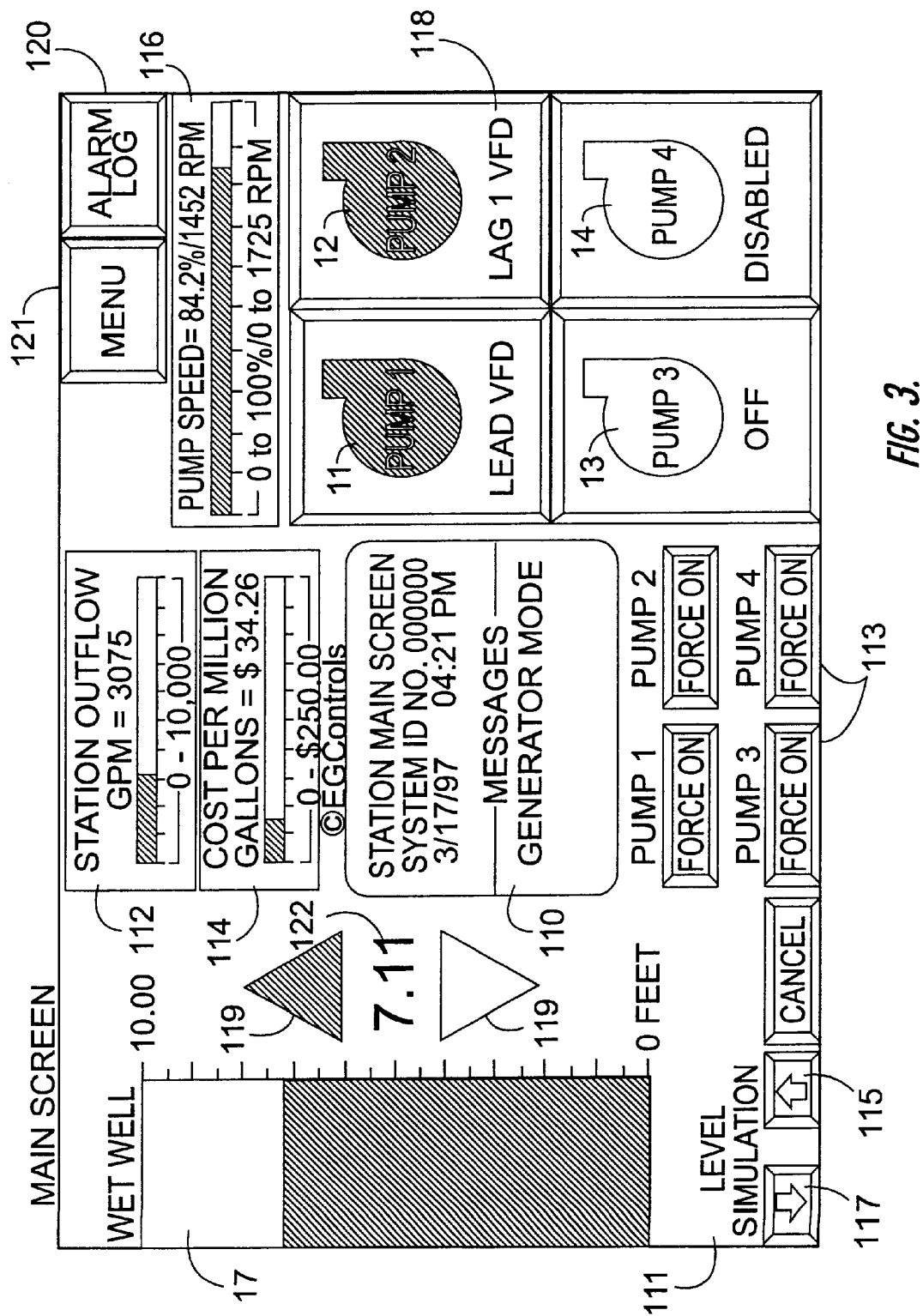
FIG. 3 illustrates the main screen.

FIG. 3 illustrates the Main Screen visible to the operator upon logging on. This screen provides general system information, including liquid level in the wet well 17, gallons per minute 112 being pumped by the station 10, and a factor known as "cost per million gallons" 114, which will be discussed in greater detail below. Also shown are data on each of the four pumps 11–14, including pump speed 116, both as a percent value and in rpm; and pump configuration and condition 118 for each pump (e.g., lead, lag 1, off, disabled). Station identification and key messages are also displayed in the center message box 110.

The main screen also includes the level simulation function 111, in which the operator can test critical aspects of system function by simulating a range of levels to confirm activation of alarms, pumps, and pumping speed changes at the appropriate levels. The "up" 115 and "down" 117 arrows are for rising and falling levels in the wet well, respectively, which is also reflected in the trending arrows 119 to the right of the wet well symbol 17. The simulated level is indicated digitally 122 between the trending arrows 119. This permits the operator to maintain control over the actual levels while testing the system at the same time.

While the Main Screen is primarily informational, it does offer some operational capabilities and direct access to other screens. For example, each individual pump can be forced "on" and "off" 113. In a particular embodiment, such a force action will be automatically canceled after a predetermined time period, such as, for example, 120 sec.

The Alarm Log button 120 alerts the operator to the presence of an alarm condition. Such a button exists on each of the system screens. If an alarm condition exists, the button 120 flashes; if the alarm is active but has been acknowledged, the light glows steadily. Once the alarm condition has been cleared, the light 120 goes out.

Figure 5:
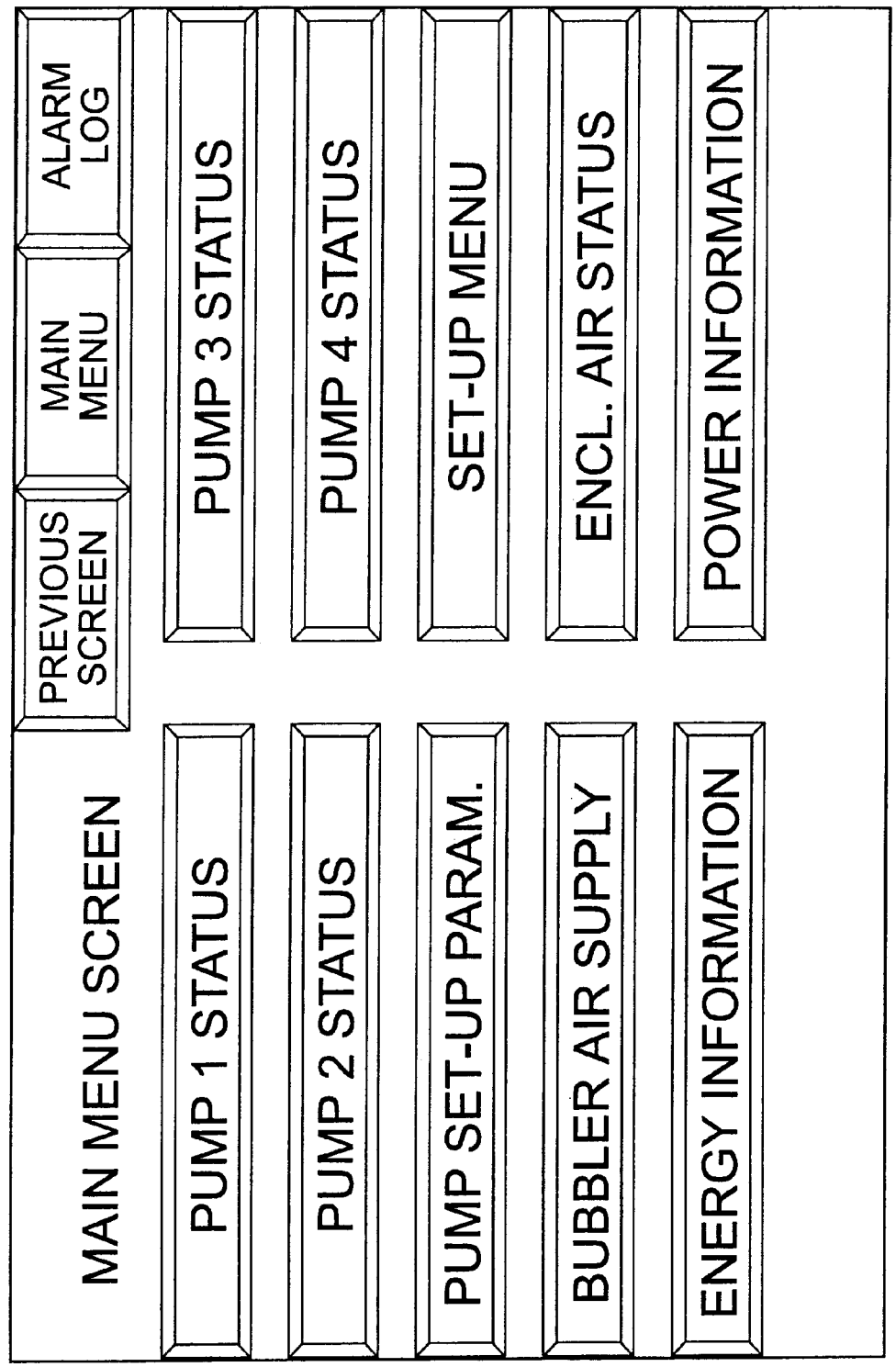
FIG. 5 illustrates the main menu screen.
Figure 8:
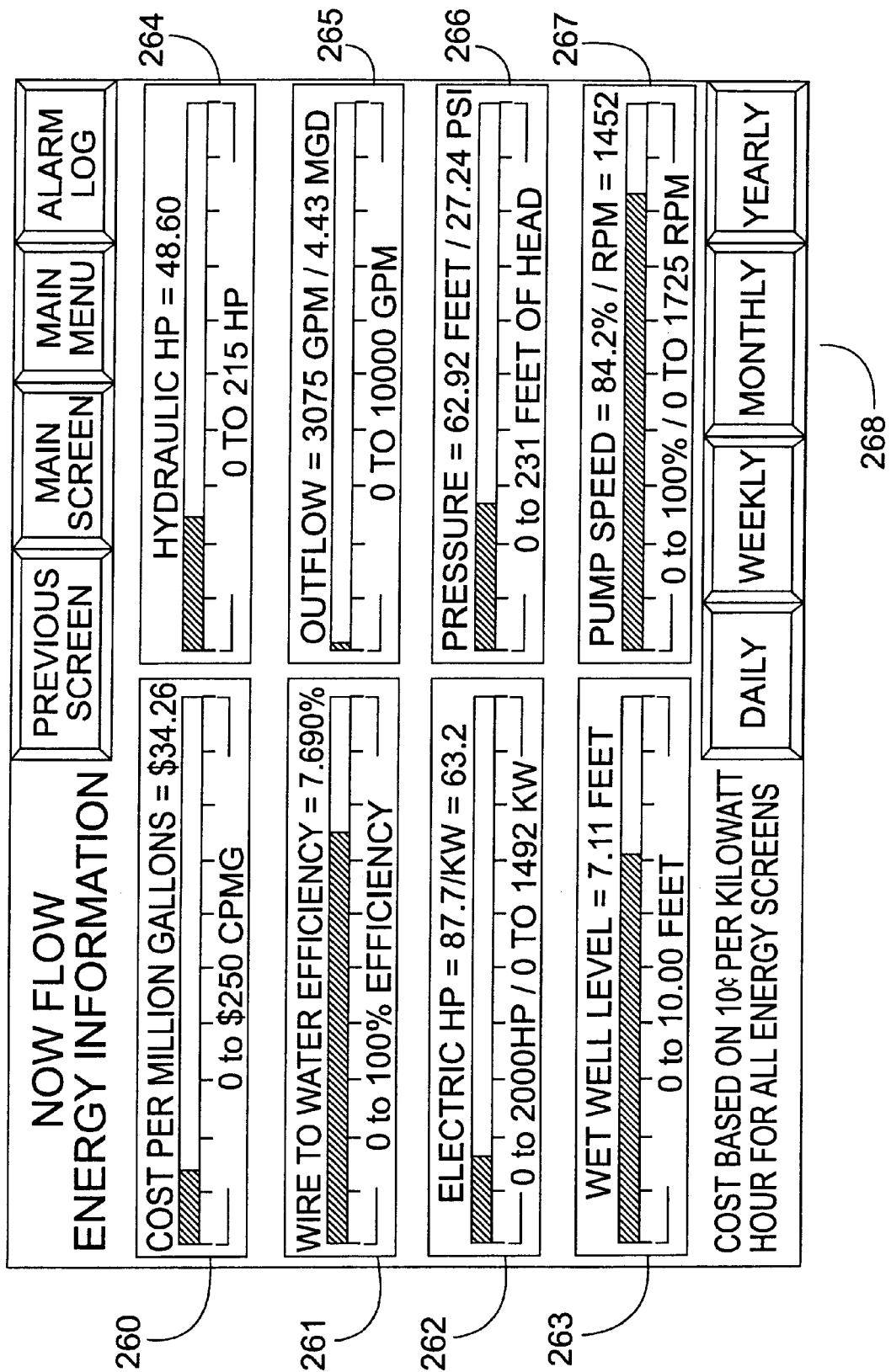
FIG. 8 illustrates a real-time ("now") flow and energy information screen.

Interaction with other screens from the Main Screen occurs as follows, preferably via buttons activated via touch: "Menu" 121 leads to the main menu (FIG. 5); "Alarm Log" 120, to the Alarm Log Screen (FIG. 4); a pump symbol 11–14, to the respective pump status screen (FIG. 6); the "Wet Well" symbol 17, to the Pump Setup Parameters screen (FIGS. 17b and 17c); and the Outflow 112 or Cost per Million Gallons 114 bargraph, to the Now Flow Energy Information screen (FIG. 8).

In another aspect of the invention (screen not shown), the system can allow the operator to initiate automated test sequences under microprocessor control. In a preferred embodiment, the system asks the operator to acknowledge proper system function in response to the test sequences. Moreover, the system memory can record and certify performance of each test, test results, and the identity of the operator, for example, via password.

The Alarm Log Screen (FIG. 4) provides a log of all alarms that have occurred within a predetermined period, including the time and date an alarm was triggered, a description of the alarm, and the time the alarm was acknowledged and reset or cleared. Using the buttons at the bottom of the screen, the operator can move through the alarm listings, acknowledge an alarm, and enable or disable the alarm cursor.

Alarms may be tripped by a number of sensed problems, including pump overheating, failure of a bubbler, or excessive vibration. By checking this screen, the operator can determine remotely if a particular piece of equipment may need to be repaired or replaced. This alarm history can be maintained in the computer memory for any desired period of time for system evaluation and comparisons between pieces of equipment. Through the touch screen, the operator can fully reset the alarm or can simply acknowledge the alarm and thereby suppress the alarm signal light or sound without resetting it.

The Main Menu Screen (FIG. 5) primarily serves as an interface to the remaining monitor and control screens. This screen leads directly to most of the status screens, represented in FIGS. 6–13, covering three primary information and control areas: system status screens, energy information screens, and control parameter setup screens.

As can be seen from FIG. 5, there is a status screen available for each of the pumps 11–14. A representative of these is shown in FIG. 6 for Pump 2 12. This screen can be reached from the Main Screen (FIG. 3) or the Main Menu Screen (FIG. 5). On the Pump Status Screen is available a complete and up-to-date status for each pump in the system, using bargraphs and digital readouts to display electrical horsepower 61 being utilized (HP and kW), station outflow 62 (GPM and millions of gallons per day, MGD), pump speed 63 (% and rpm), and variable-frequency drive 64 (VFD) air intake temperature (° F.).

Additionally, on the lower left are listed a plurality of current pump operational indicators 65. An arrow next to an item in the list indicates that it has been activated. The conditions include pump position or status in the alternation scheme (e.g., lead, lag, disabled); pump in manual or automatic condition; pump called to run in VFD or bypass condition; pump running in VFD or bypass condition; positive run verification (VFD low/high run verify—further discussion on this is found with FIG. 17a).

The lower central and right columns list alarm situations 66 that, when flashing, have been tripped. As indicated, the operator is to press a flashing item once to acknowledge that he/she has seen the alarm and twice to reset the item. In the exemplary embodiment, 22 diagnostic alarm conditions are shown, each requiring a sensory input to display. Should a particular system not have one or more of these inputs, an indication of "not available" is displayed. Thus there is considerable flexibility in system setup.

There are three types of resets for the diagnostic alarms shown in FIG. 6. Those conditions labeled "SR" can be reset from the screen by pressing twice. The automatic reset (AR) is automatically reset by the system when the event prompting the alarm condition has ended or when the event has cleared itself. The external reset (ER) requires an operator to go to the source of the alarm to evaluate the problem before resetting the condition.

Figure 10:
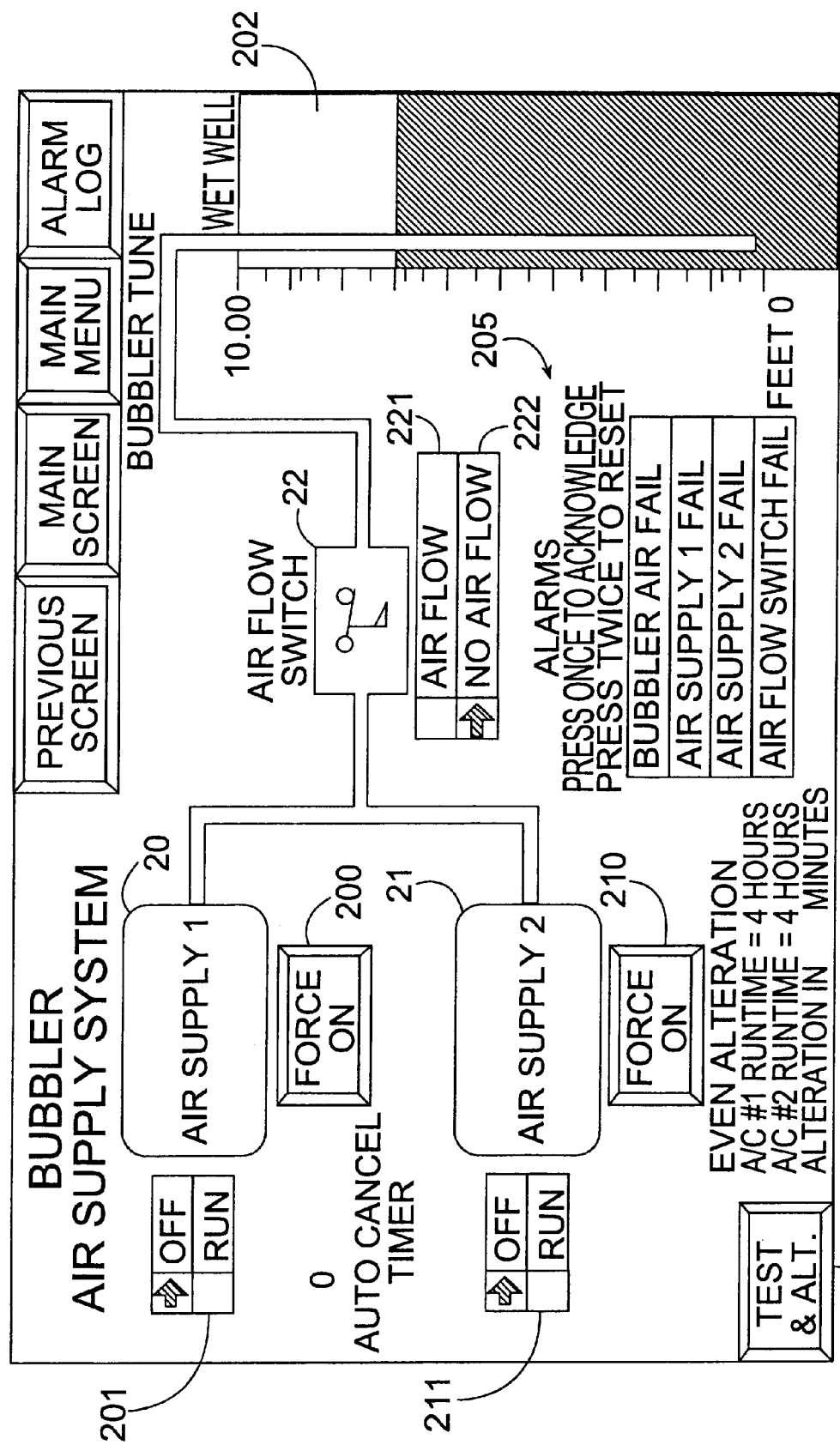
FIG. 10 illustrates the status screen for the bubbler air supply system.
Figure 14:
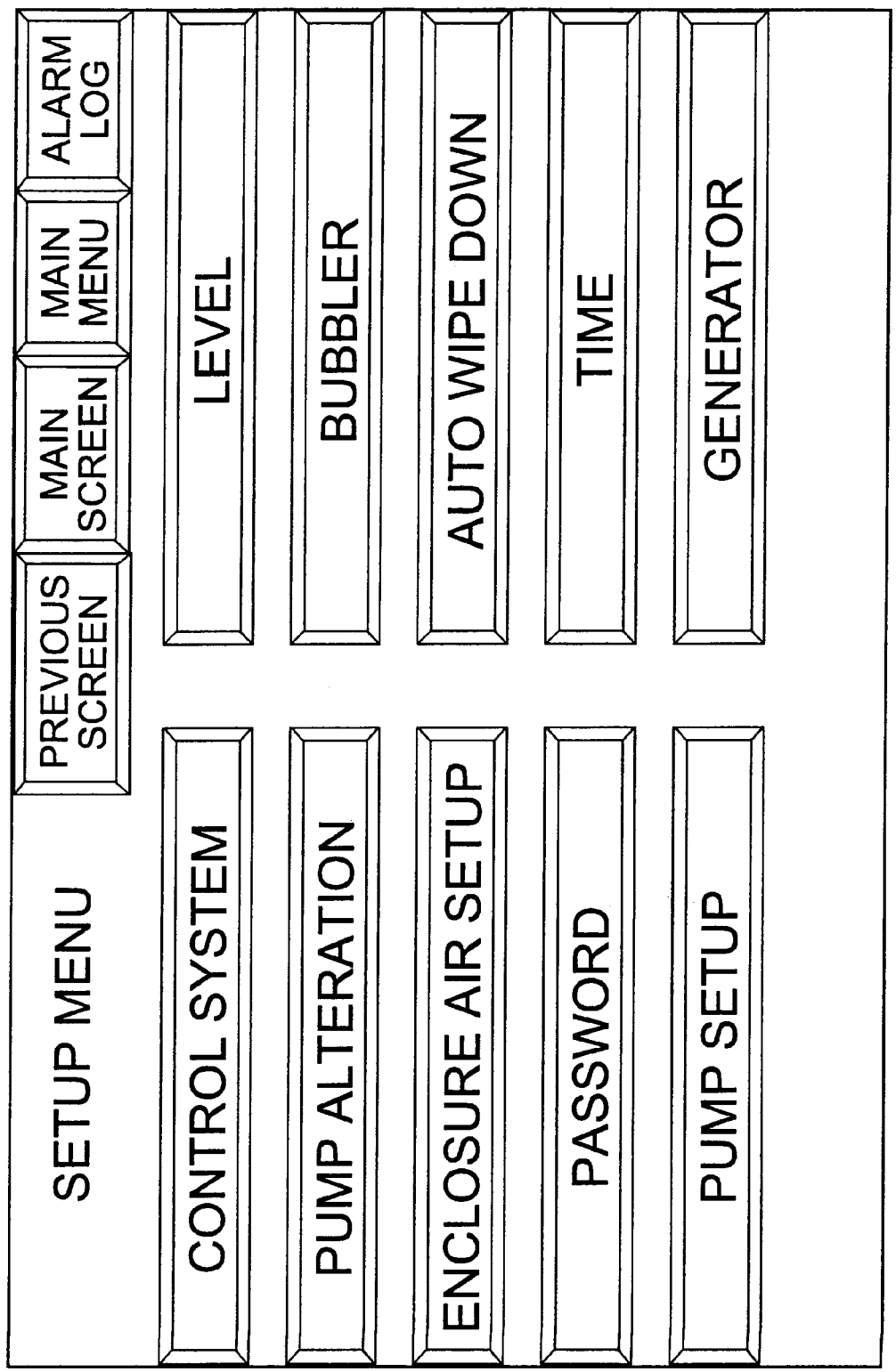
FIG. 14 illustrates the setup menu screen.
Figure 16B:
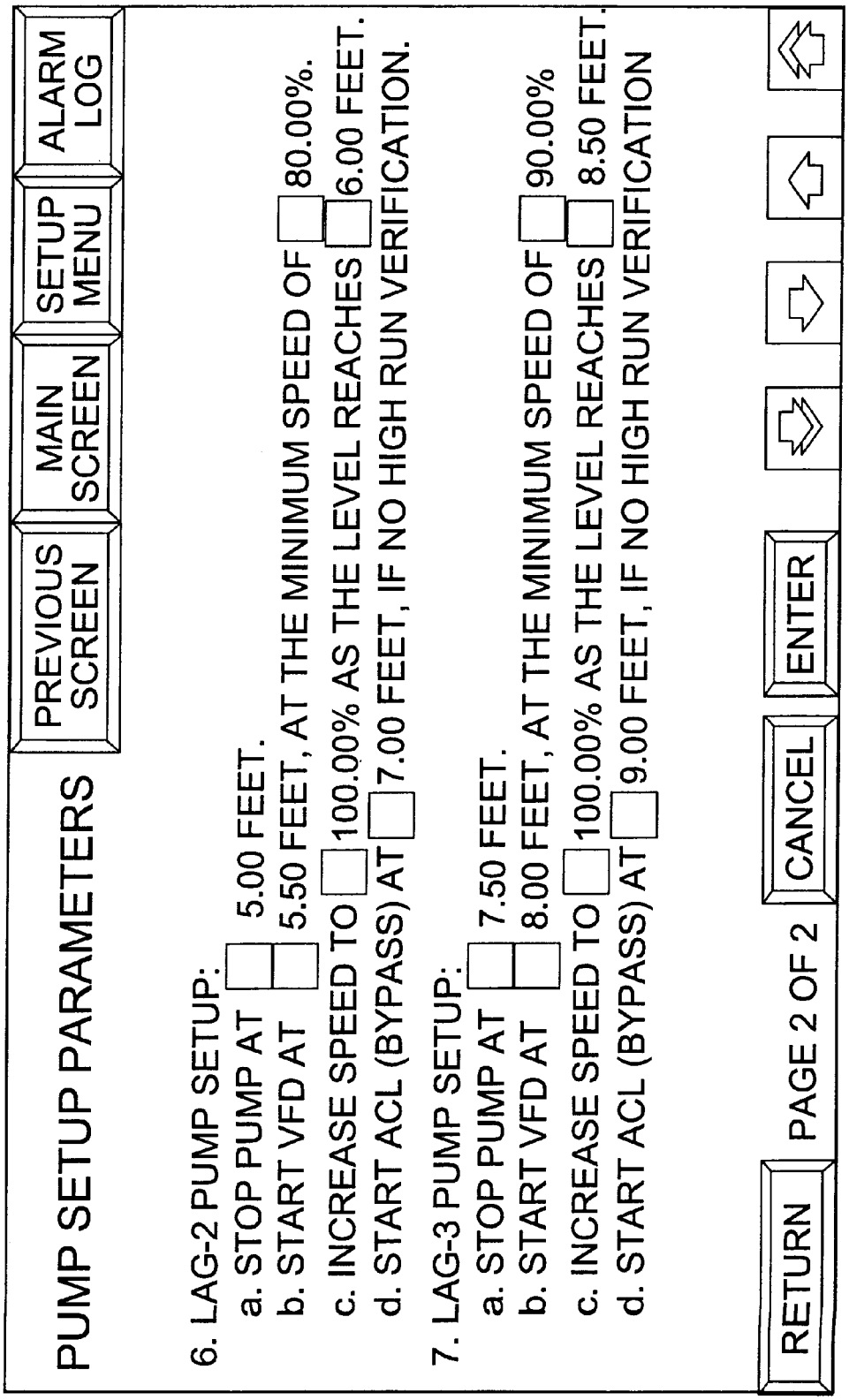
Figure 17B:
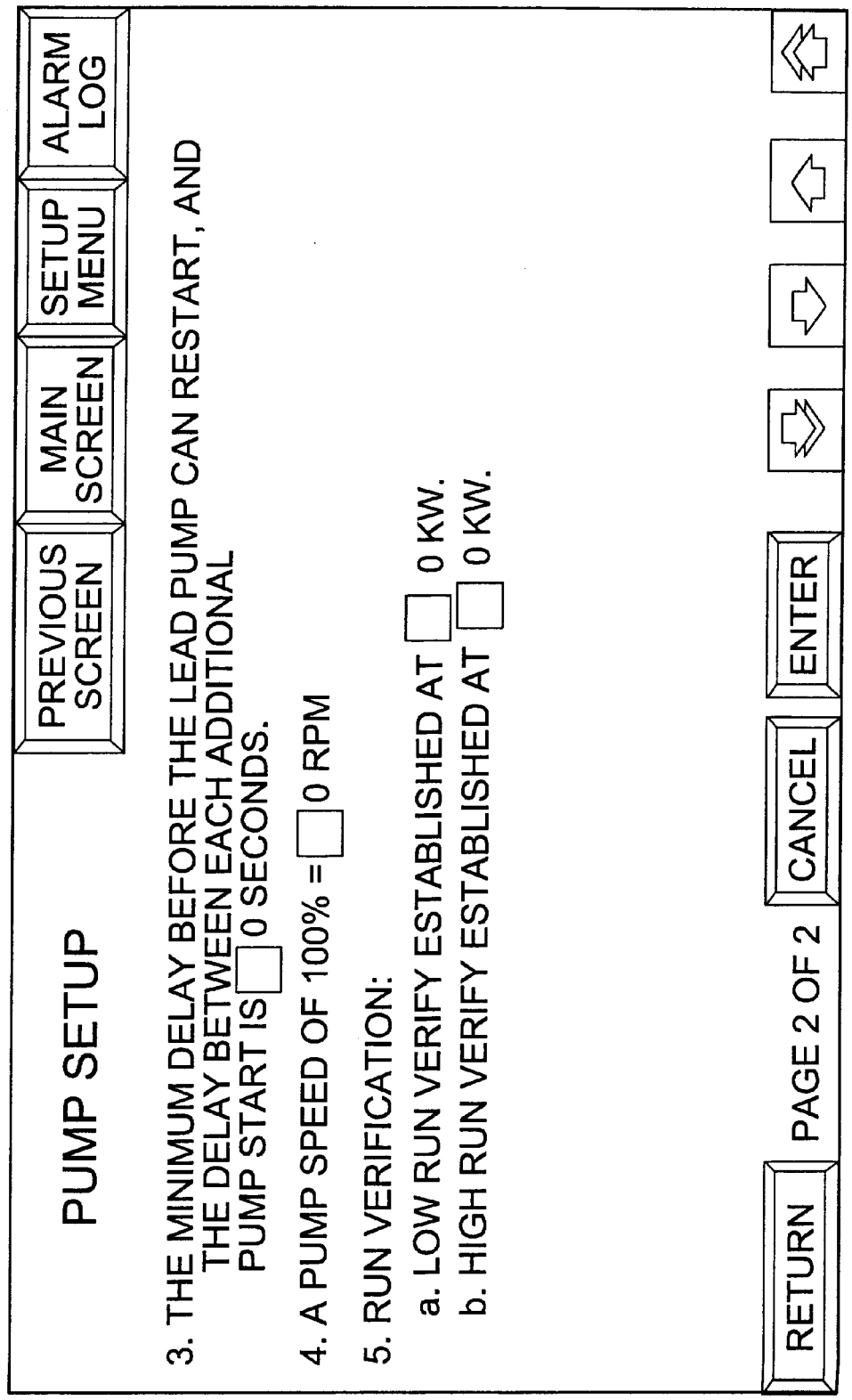
Figure 20:
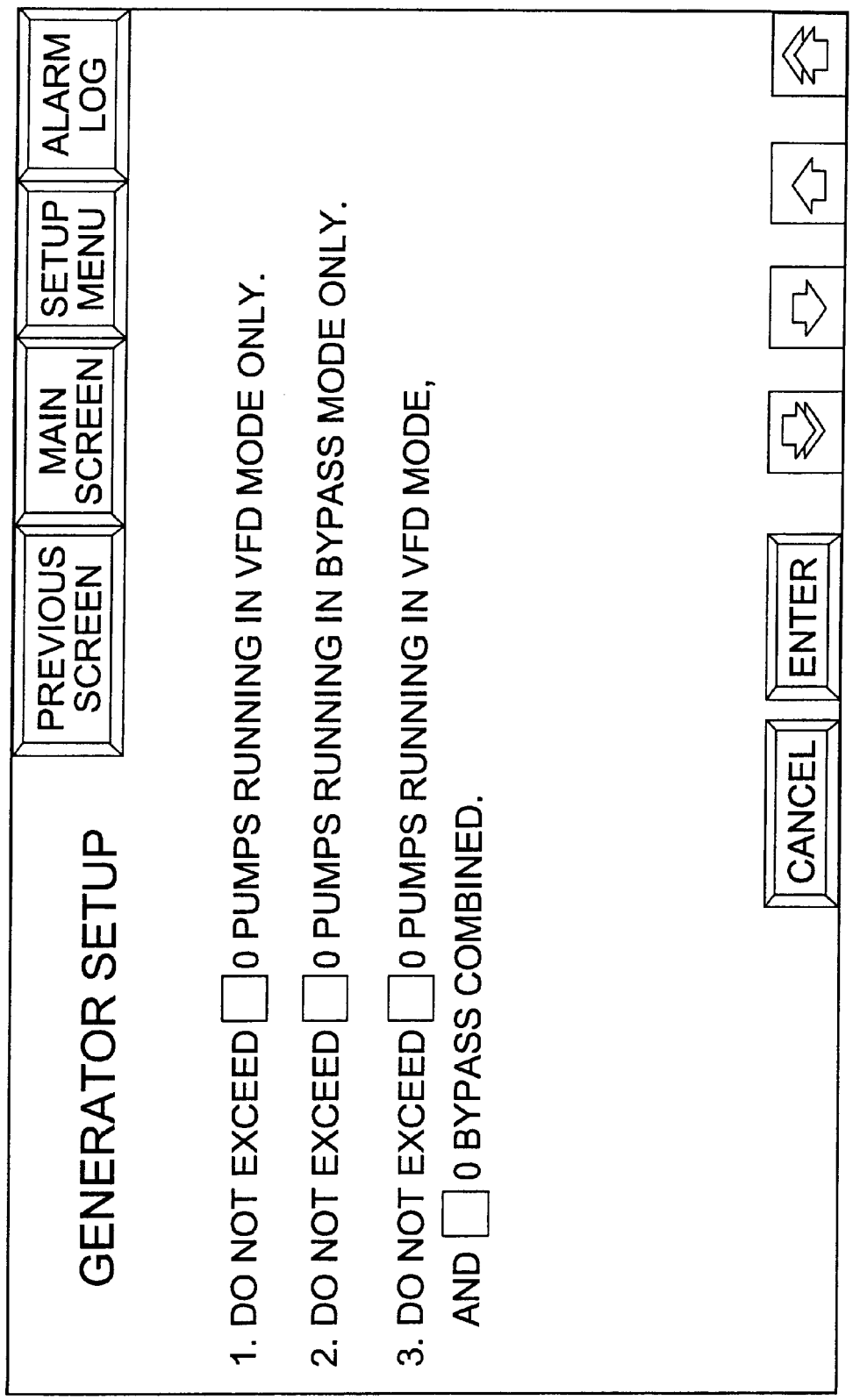
FIG. 20 illustrates the generator setup screen.

Skipping to FIG. 10, the Bubbler Air Supply System Screen is shown, which provides information on the status of two air supplies, indicated to the left of the air supply icons 20,21, showing "OFF" and "RUN" 201, 211 conditions. The air flow switch 22 is also shown, with indicators for "AIR FLOW" 221 and "NO AIR FLOW" 222. Again the liquid depth in the wet well 202 is illustrated via a bar graph. The type of alternation is indicated 204 and the time to next alternation. The alternation scheme for the air supply system is a user-selectable parameter and is selected through the setup menu (FIG. 14)

A list of alarms 205 is also provided to monitor bubbler air fail, air supply 1 and 2 fail, and air flow switch fail. As previously, the alarms can be acknowledged and reset by pressing them once or twice, respectively. Bubbler system testing can be conducted by touching the "TEST & ALT." button 206. The air pumps can also be forced on or off by touching the appropriate buttons 200,210.

In a particular embodiment, a submerged transducer may serve as the primary sensor. A redundant bubbler system can serve either as a backup or as the primary sensor.

Figure 11:
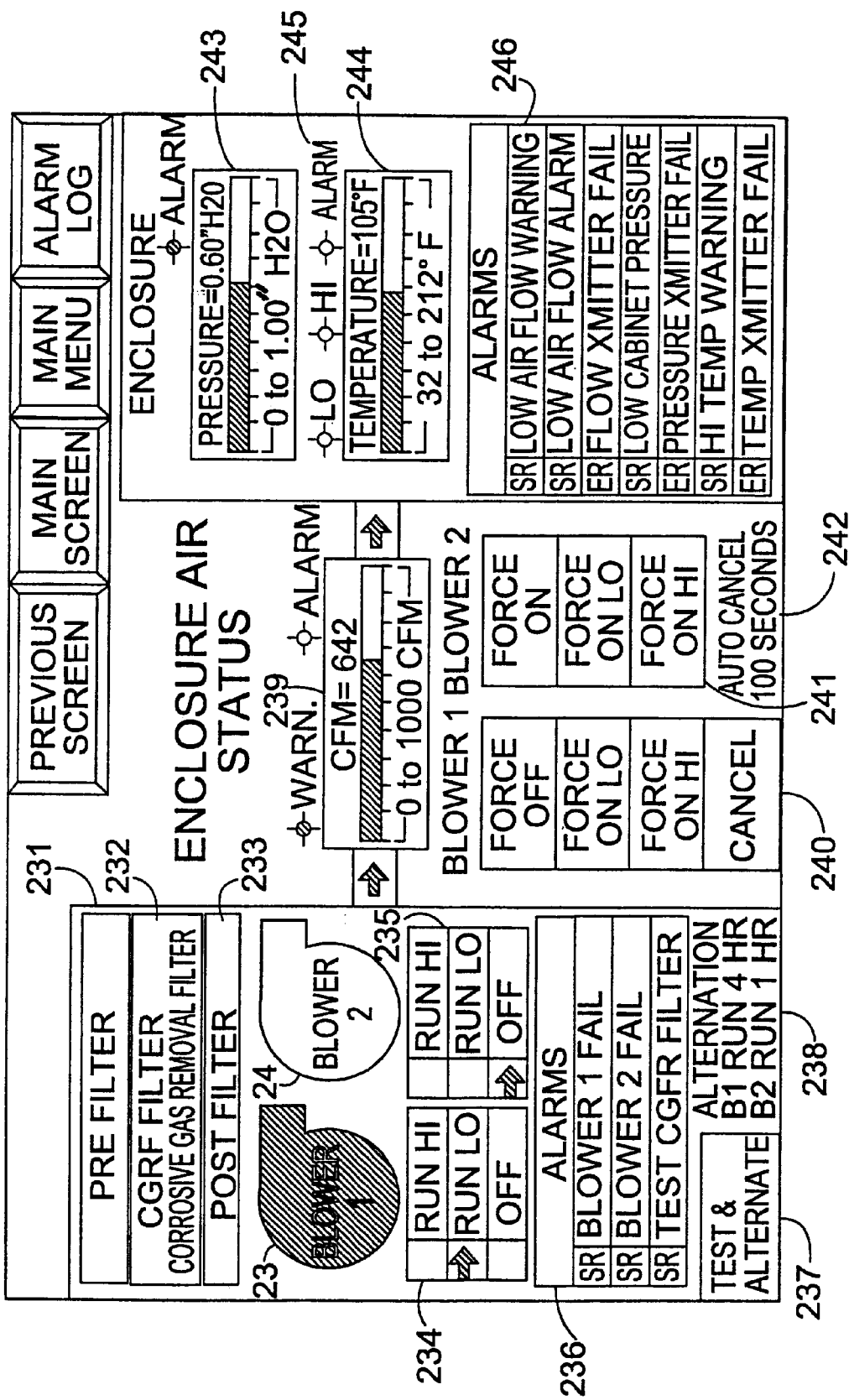
FIG. 11 illustrates an enclosure air status screen.
Figure 13:
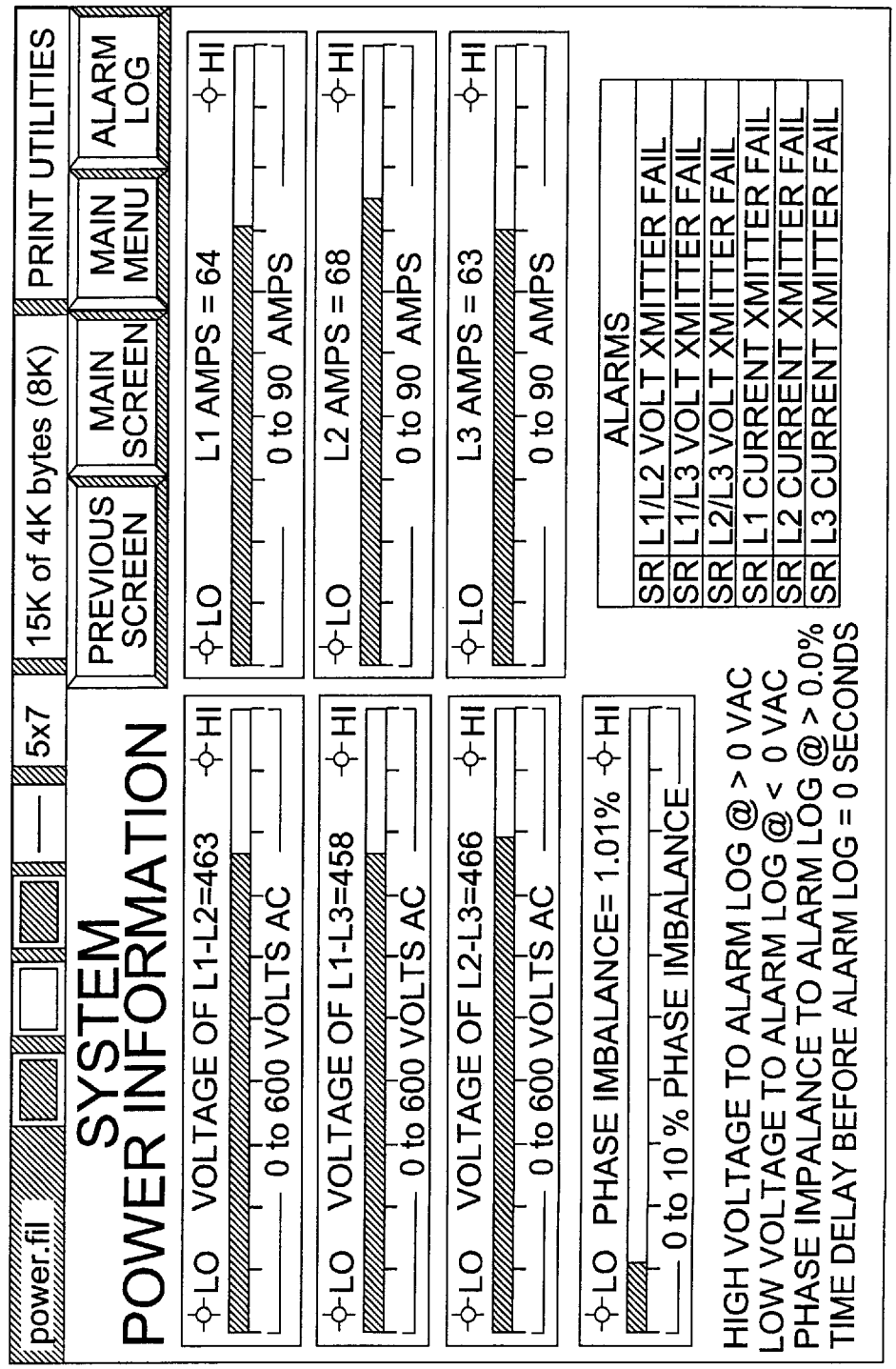
FIG. 13 illustrates a system power information screen.

Similarly, in FIG. 11 is illustrated a Enclosure Air Status Screen. In this embodiment, there are shown icons for two blowers 23,24, a primary and a standby. The icon is lighted when the blower is running. Preferably each blower is capable of cooling the entire system and of maintaining air quality in the central enclosure by excluding corrosive sewage gases. The screen comprises four sections:

The blower and filtration status (upper left) section is used to control the blowers and offer specific information about filters within the system and alarm conditions pertaining to blowers. The PRE filter 231 is used to filter dust and dirt particles to keep them out of the cooling system. The corrosive gas removal filter (CGRF) 232 is used to filter corrosive gases such as sulfur dioxide or hydrogen sulfide and prevent them from entering the control system. The POST filter 233 is used to filter CGRF media and prevent this residue from entering the control system. The blower condition boxes 234,235 indicate whether a blower is running high, low, or off. Blower alarm conditions are shown 236 to indicate Blower 1 or 2 fail or test CGRF filter. As above, acknowledgment and reset are accomplished by touching once or twice.

The test and alternation section (lower left) comprises a "TEST & ALT" button 237 to manually alternate blowers and check the operating status of the standby blower and air flow transmitter. The alternation box 238 displays the type of automatic alternation being employed by the blowers.

In the center portion of this screen are shown manual override controls for operating the blowers. Displayed are the cubic feet per minute (CFM) being blown 239, shown in bar graph and digital form, and the manual control functions for each blower 240,241, including blower force off, force on hi and low, and cancel. These buttons take the blower out of automatic mode and into the selected condition. Any forced condition is automatically cancelled after a predetermined period, typically 120 sec, as shown 242.

The enclosure environment (right side) is indicated by pressure 243 and pressure 244 bargraphs and digital readouts. Indicator lights 245 above the temperature bargraph 244 reflect the fans' speed responsive to the temperature condition(s) of the drives. As above, alarm conditions are listed 246 with their corresponding reset capabilities.

The Pump Setup Parameters screen (FIG. 12) displays the settings for the four pumps, the present wet-well level, the high- and low-level alarm settings, and the present pump speed as a percent of maximum. Further, the level settings and the sequencing for all pumps in the system are displayed. The user can also designate a standby pump to run when a pump fails or when the standby start level is reached.

The System Power Information Screen (FIG. 13), reachable from the Main Menu screen of FIG. 5, provides a complete overview of the external power being supplied to the control system. Seven bargraphs and digital readouts update and display the voltages across the three lines of incoming three-phase power L1, L2, and L3 251–253, the current on each line 254–256, and the phase imbalance 257.

Specific information is provided at the lower left 258. These are user-selectable parameters affecting alarm conditions related to system power, indicating when the voltage is greater or less than a desired voltage, a phase imbalance greater than a desired percent value, and the time delay before the alarm condition is sent to the alarm log.

System power alarms are displayed for transmitter failure(s) 259 on the lower right.

Figure 7:
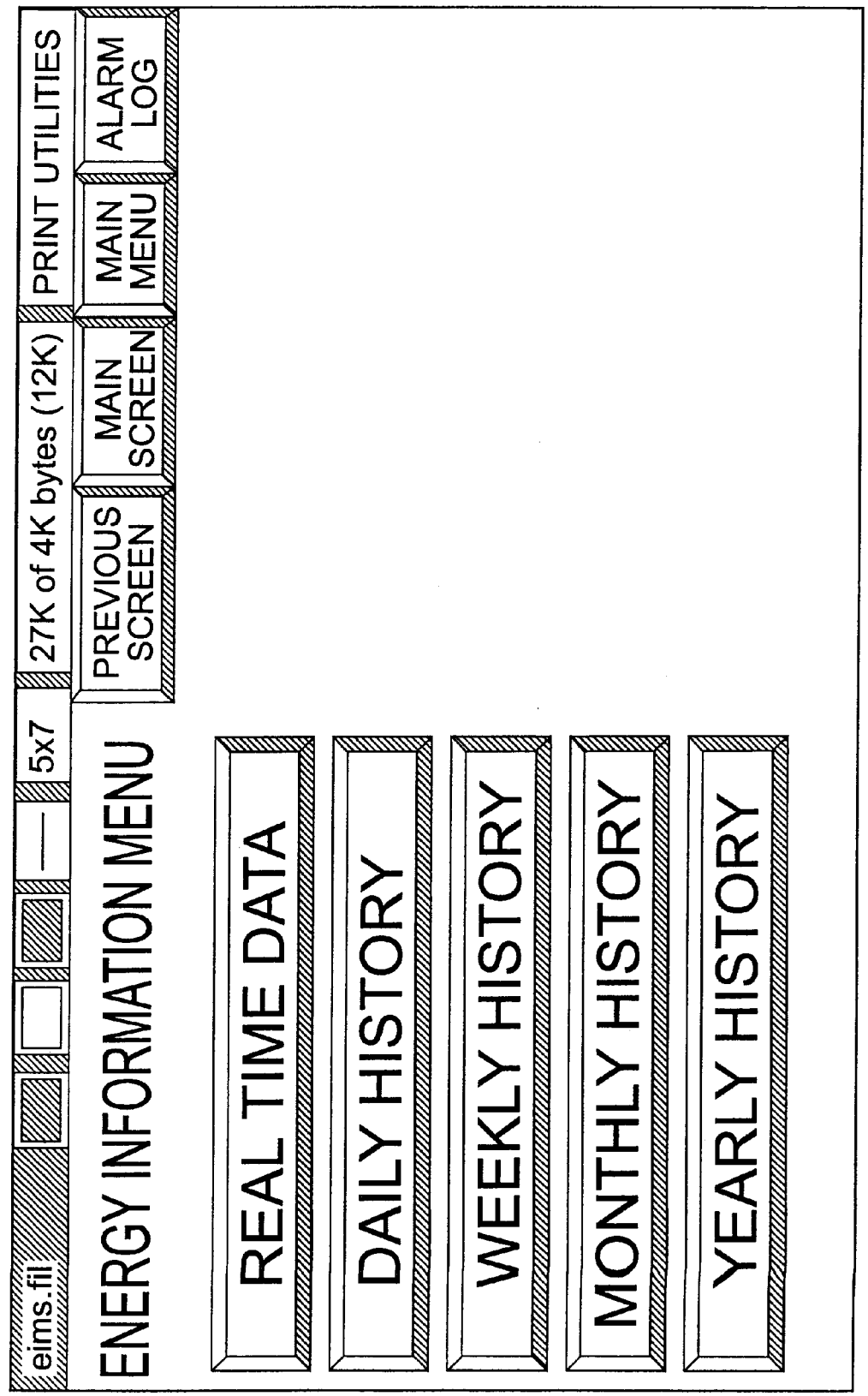
FIG. 7 illustrates an energy information menu screen.

FIGS. 7–9 illustrate the energy information screens, which provide a complete picture of the energy consumption patterns of the system, permitting the user to optimize pump selection and control; identify pump degradation; properly set up and sequence the pumps; and analyze cost and energy savings from corrective actions and adjustments. A full energy information system utilizes data from four external sensory inputs: level input, kilowatt transmitter on the line side of the control system, flow meter input, and pressure transmitter at the discharge or manifold of a pump.

The Energy Information Menu (FIG. 7) provides the operator a choice of viewing energy usage information on a real-time or historical basis and comprises a vehicle for moving through the system.

FIG. 8, which illustrates the "Now" (real-time) Flow and Energy Information Screen, provides system data in bargraph and digital form, including calculations made by the computer 18 from sensed system data for calculating a real-time cost parameter of the system. In the case shown, this cost parameter comprises energy usage per volume of liquid pumped, or, as mentioned previously, a Cost per Million Gallons™ (CPMG) figure 260.

Additional data also given on this screen include the "wire-to-water efficiency" 261 (in %), horsepower (electric 262 and hydraulic 264), wet-well level 263, outflow 265, pressure (feet of head and psi) 266, and pump speed 267. Buttons 268 are provided on the lower right for navigating to the historical screens:

Historical flow and energy information is provided in the screens shown in FIGS. 9a–d for, respectively, daily, weekly, monthly, and yearly periods. The columns in each of these screens list time period (the specific time period being measured), millions of gallons pumped in that time period, time-based energy cost, and average CPMG.

An additional feature of the screens of FIGS. 9a–d is given in the final column, which displays calculations from the computer for predicting a future cost parameter over a predetermined period of time, the future cost parameter being the predicted energy cost, shown as a dollar amount. The future cost is calculated as a function of predicted cost per volume liquid pumped and predicted wet-well inflow. In the simplest case, the most recently recorded values of each quantity are extrapolated into the future. Higher accuracy may be obtained using more complex methods. For example, a knowledge of previous cyclic flow variations can be used to predict future inflows. Pump degradation can also be extrapolated into the future.

The Cost per Million Gallons™ Factor

It can be appreciated that the CPMG figure represents an inverse of a throughput efficiency figure, which equals the quantity of material pumped divided by the energy consumed.

CPMG was developed to show the direct relationship between gallons pumped and dollars spent on energy used to transfer one million gallons of liquid pumped from the lift station well 17 to the discharge from the lift station force mains.

The CPMG reading can be compared to the "wire-to-water efficiency" rating, which has been considered the industry standard for defining the optimal operating state for a pump station. The wire-to-water efficiency factor is calculated as the hydraulic horsepower output of the pump divided by the electric horsepower input to the pump motor. Since it is understood that electric HP drops with a reduction in pump speed, it has always been assumed that energy costs would drop as well. The wire-to-water efficiency was then judged to be the best measurement to use in determining energy-efficient and effective pump speed.

The CPMG factor has surpassed wire-to-water efficiency ratings and has proved to be a much more reliable and accurate predictor of energy usage and costs. As an added benefit, CPMG is not limited to any type of pumping station. It can also be applied to any type of pumping station and can be readily understood by all involved personnel. It should also be noted that "cost" can include, in addition to energy costs, maintenance costs or other usage costs that depend on the operating parameters of the system. For example, a wastewater pumping system can incur overflow charges based on the duration of an overflow.

It is also possible that the cost-per-throughput value can be more complex. For example, it is common in wastewater lift stations to have energy costs that depend on time of day and on power consumption rates ("peak surcharges"). In such cases this value offers advantages over previously used systems.

Testing has consistently shown that the CPMG is the only known reliable method of determining the lowest-cost pumping speed. In multiple pump stations, CPMG can also be used to find the best pump operating and alternation patterns. The CPMG factor can also be applied as a predictive maintenance tool to alert the operator to a need for repair or replacement of equipment. Specifically, by correlating the real-time operating parameters of the equipment with a time history of its operating parameters stored in the storage means, or with predetermined desired operating parameters, one can predict the failure of that pump station element. For example, a significant increase in the CPMG may show that a pump is not operating as expected. A closer examination may show pump degradation in one or more pumps. The operator can then test the pumps, evaluate the CPMG ratings, and determine if it is more cost effective to replace or repair the pump or continue to run the pumps until degradation worsens. CPMG is the best known quantitative method usable for making this type of decision.

Calculation of Throughput Efficiency and Cost per Throughput

Calculating the throughput efficiency includes calculating cumulative material flow and energy consumption over some predetermined time period, and then calculating a single efficiency parameter using both of these quantities.

The throughput efficiency η is:

$$\eta = \int_{t_0}^{t_0+\Delta t} Q(t)dt \Big/ \int_{t_0}^{t_0+\Delta t} P(t)dt$$

where $Q(t)$ denotes a material flow parameter such as volume or mass flow rate measured by one or more transducers at time t, $P(t)$ denotes power consumed by the motors of one or more pumps at time t, and the parameter is calculated for a time interval $\Delta t$ beginning at time $t_0$. Power consumption can in turn depend on a number of operating parameters, including pump speed, pump selection, wet-well level, flow, state of check valves, and condition of pipelines and other components. Typically, $Q(t)$ and $P(t)$ are measured directly; however, it can also be useful to calculate at least one of $Q(t)$ and $P(t)$ as a predetermined function of various real-time operating parameters, for purposes of controlling these parameters to optimize operating efficiency.

Similarly, calculating cost per throughput always includes calculating cumulative material flow and costs over some predetermined time period, and then calculating a single efficiency parameter using both of these quantities. A preferred form of cost per throughput is:

$$\int_{t_0}^{t_0+\Delta t} C(t)dt \Big/ \int_{t_0}^{t_0+\Delta t} Q(t)dt$$

where $C(t)$ denotes the cost rate at time t. In general, $C(t)$ cannot be measured directly, but must be calculated from measured or predetermined operating parameters. Typically energy costs are a major contributor; so a preferred form of $C(t)$ is $$C(t)=P(t)r(t)+c(t)$$

where $r(t)$ is the real-time cost per unit energy and $c(t)$ denotes the rate of costs other than energy costs (such as overflow penalties). As above, the various components of $C(t)$ can be expressed as predetermined functions of various operating parameters for the purpose of optimizing or comparing system operating efficiency.

In practice, the integrals are usually approximated as sums calculated by a microprocessor using standard numerical methods, or measured by electronic integration of an analog signal (for example, integrating current on a capacitor). The choice of specific transducer outputs and integration times used in the calculation depends on the specific calculation, as will be seen.

Systems with Cyclic Flow

An additional principle applies to systems characterized by cyclic inflows or outflows. In these systems operating efficiency is preferably calculated for a time interval $\Delta t$ comprising an integral number of cycles. For example, a wastewater lift station usually has a cyclic level versus time profile (and cyclic outflow by inference), as shown in FIG. 27b. The operating efficiency can depend on the wet-well level because a high level at the inlet increases the inlet pressure. Therefore, the operating efficiency can vary in a cyclic fashion, and invalid conclusions can result if two pumps, stations, or time periods are compared based on different portions of a cycle.

Figure 27A:
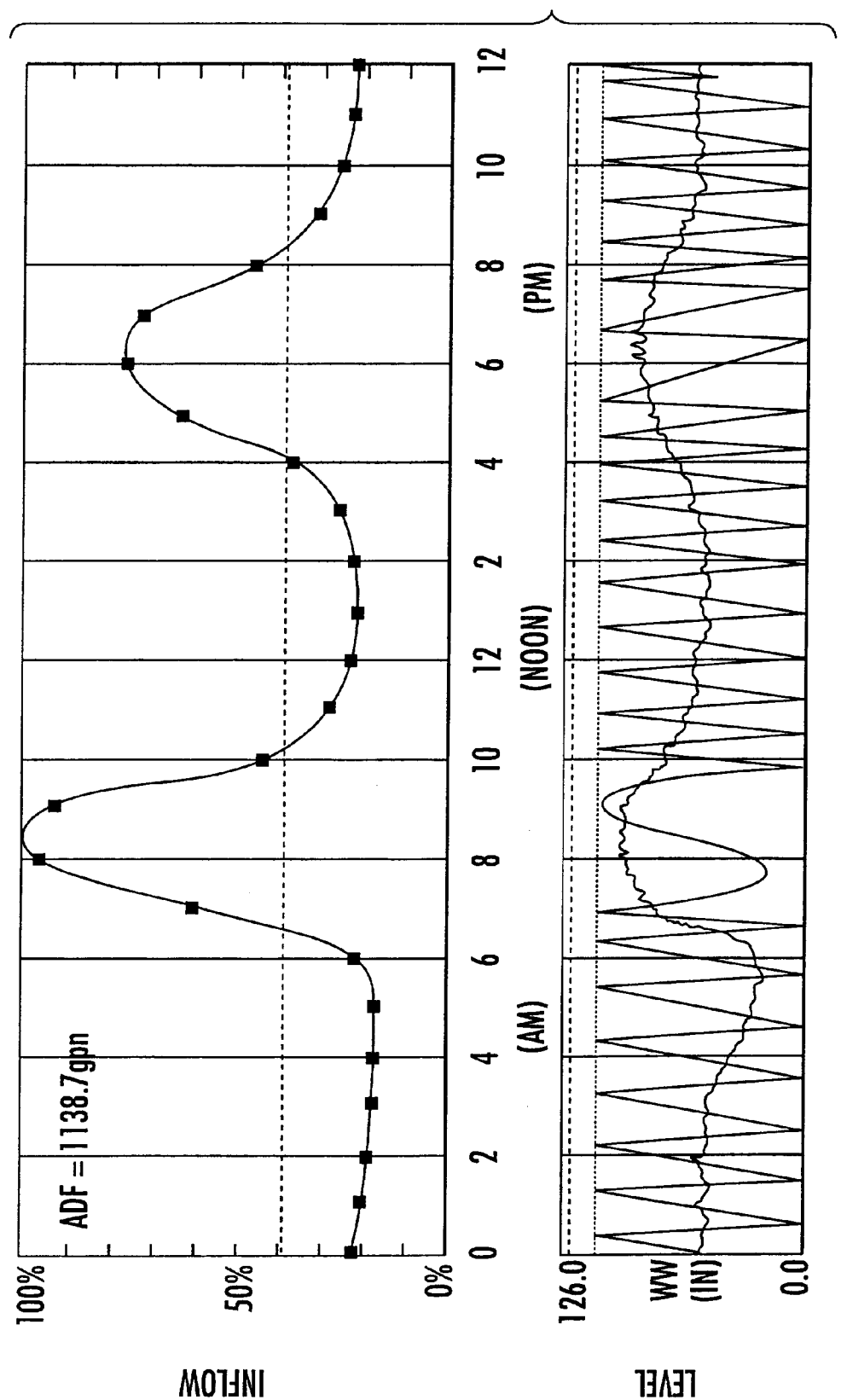
FIG. 27a graphically represents a typical inflow profile and the resultant wet-water level under the operation of a pumping system.
Figure 27B:
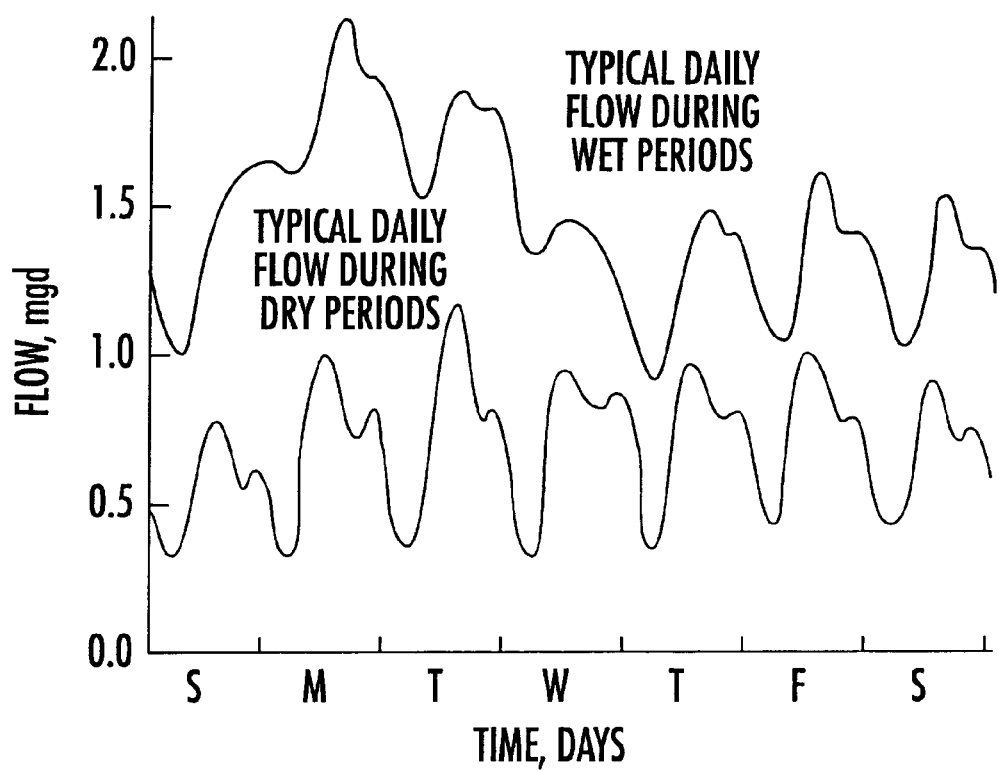
FIG. 27b, typical daily and weekly variations in sewage flow.

In another example, wastewater inflows are known to have predictable daily, weekly, and seasonal cyclic variations (see FIG. 27a for an exemplary inflow profile taken over one day). For the most accurate comparisons, long-term operating efficiency is preferably calculated over an integral number of these cycles.

In some cases it is necessary to calculate operating efficiency over a portion of a cycle. In these cases operating efficiency is preferably calculated over a time period having a predetermined relationship to a flow cycle, and comparisons are preferably based on similar portions of a given cycle.

Throughput efficiency of a single pump

In a system having a single pump, a first transducer continuously provides an analog signal that is proportional to the flow Q at the pump outlet. Alternatively, flow can be calculated from wet-well rate of rise and a predetermined relationship between wet-well level and quantity. A second transducer continuously provides an analog signal proportional to the electrical power P consumed by a motor coupled to the pump. Alternatively, P can be calculated from measurements of voltage, current, and power factor. In either case, a microprocessor repeatedly samples both Q and P at points in time $t_i$ separated by a constant interval $\delta t$. The throughput efficiency is then:

$$\sum_i^N Q_i / \sum_i^N P_i$$

For cyclic flows, $N\delta t$ is preferably an integral number of cycles. The calculation can be more accurate with more complex numerical integration schemes, such as a trapezoidal method.

Throughput efficiency of multiple pumps in parallel

Transducers measure the flows Q1 and Q2 at the outlets of pumps #1 and #2, and the powers P1 and P2 consumed by the respective pump motors. The calculation is the same as above, except Q=Q1+Q2 and P=P1+P2. Alternatively, Q can be measured by a transducer at the outlet header of the combined pump system. In a system without a flow transducer, Q can be calculated from the rate of change of the water level in the wet well.

Cost per throughput

Transducers measure the flow and power as in the previous examples. Information on cost per unit energy as a function of time, r(t), is stored in the data storage means. If $r(t)=r_0$ is a constant, then cost per throughput can be calculated directly or from throughput efficiency:

$$r_0 \sum_i^N Q_i / \sum_i^N P_i = r_0 / \text{throughput efficiency}$$

In many areas r(t) varies with time of day, day of the week, or time of year. In this case a table of values of r versus t can be stored in system memory or on disk, and these values can be used to calculate cost per throughput:

$$\sum_i^N [r(t_2) \cdot P_i] / \sum_i^N Q_i$$

In some areas r(t) also depends on the station's real-time power demand, or rate increases ("demand charges") may be applied based on the history of power demand.

The Control System for a Pump Station

In another aspect of the system 15 of the present invention, a control system is provided, again for interfacing between an operator and a pump station having a pump for pumping a fluid. As with the monitoring system, means are provided for sensing a plurality of operating parameters of the pump station and also for transmitting the operating parameters to the operator in real time. An additional feature is provided in the form of means for the operator to communicate a control signal to the pump station to effect a change in an operating parameter.

The screens involved in the control aspect of the present invention are shown in FIGS. 14–23. The Setup Menu Screen (FIG. 14) is accessed from the Main Menu Screen (FIG. 5) and in turn provides access to the programmable logic controller, from which the individual setup and control screens (FIGS. 15a–24 are accessed. All these screens are utilized in similar manner: yes/no-type entries are made by touching the desired button; numerical entries are made by pressing the appropriate up or down arrow and, when the desired value is reached, pressing "enter." The "cancel" button returns to the previous setting.

The Control System Setup Screens (FIGS. 15a and 15b) permits the operator to control key functions, such as enabling the auto wipe-down feature to clean and purge sediment and scum from the pumping system (see FIG. 21), enabling password protection (see FIGS. 22a and 22b), providing scaling for the level and the flow sensors, controlling system alarms, and enabling the printer option.

The Pump Parameters Setup Screens (FIGS. 16a and 16b) permits the operator to set the operational setpoints of the control system. Included are the high and low level alarms, pump start and stop levels for each pump position, the pump VFD start level, the VFD minimum and maximum speed levels (%), the pump in bypass level, and a setting for stopping a pump at a low level while in the manual mode. The individual pump settings, (4)–(7) on FIGS. 16a and 16b, permit settings for simplex through quadruplex configurations. It is an important feature that different setpoints are permissible for each combination.

Further configurational control is established using the Pump Setup Screens (FIGS. 17a and 17b), with which the operator is permitted to specify pump operation modes (VFD, bypass, or a combination thereof), assign pump position (lead, lag, or standby), set minimum delay between pump starts, set pump speed (rpm), and create settings for high and low run verification.

The Bubbler Air Supply Setup Screen (FIG. 18) permits the specification of setpoints needed to operate the bubbler air supply system, including creating the bubbler alternation pattern and the blowdown feature setpoints. Bubler alternation may be one of uneven, even, and manual. While in automatic mode, uneven alternation is recommended to ensure the extended life of the standby air compressor. In order to use bubbler blowdown, the system must include the circuitry and air supply capacity to produce high-pressure blowdown. The screen permits the enabling of the blowdown feature and the time increment between blowdown cycles.

The Enclosure Air Setup Screen (FIG. 19) similarly permits the specification of operational parameters of the cooling and filtration unit. Using the screen the operator sets blower alternation (one of uneven, even, and manual); CFM alarm (determines when the low-air-flow alarm from the blower to the enclosure is activated); cabinet pressure alarm (determines when the low cabinet pressure alarm is activated); and the high-temperature condition (determines when the blower will go to the highest speed to cool the enclosure environment).

The Generator Setup Screen (FIG. 20) allows the confirguration of the pumps to run in any combination consistent with the maximum full load current capacity of the standby generator. This screen permits the programming of the system for proceeding during a power failure when the generator serves as the only source of power and the system cannot run at full capacity. The system can then automatically revert to the desired configuration to keep the system operating. The operator sets the maximum number of pumps in one of three modes: VFD only, bypass only, or a conbination.

The Auto Wipe-Down Setup Screen (FIG. 21) enables the operator to configure the automatic flushing of the wet well and the purging of the wet well piping. Automatic flushing and purging are beneficial when sediment builds up within the wet well and when low-velocity pumping creates sediment fallout in the pipes. This fallout can have an adverse effect on the dynamic head condition at the pumping station. Such conditions are more common at a collector or interceptor station than at a master lift station at the head works of the plant. For any station, however, this auto wipe-down feature solves the buildup problem in the wet well or force main. The operator should consider the following when determining how and when to use this feature: time of day, flow rate, peak or off-peak hours, the location of pump station (collector, interceptor, or head works).

The following settings are created through the Auto Wipe-Down Setup Screen: enable wet well flush (used when sediment and scum can build up in the wet well); enable effluent pipe purge (used when sediment can build up in the pipes due to low-velocity pumping conditions; pump wet well down (this is the lowest level in the wet well that can be maintained without damaging the pumps); hold flush level (the value for which the drives should adjust their speed and hold the level down to the wet-well level specified previously; this should allow ample time for the inflow to stir up the sediment sufficiently in the bottom of the wet well and for the pumps to be able to pump sediment into the pipes); pumps in VFD mode (the number of pumps to be used for the pipe purging process and the % speed for the pumps to run during wipe down); wet well rise/purging the pipe (the desired maximum level to be reached in the wet well prior to the purging process; increased water volume makes the purging process most effective; determine the absolute highest level that can be reached safely); and setting time intervals (two values are selected: the time between wipe downs and the time of day for wipe down to occur).

Figure 22B:
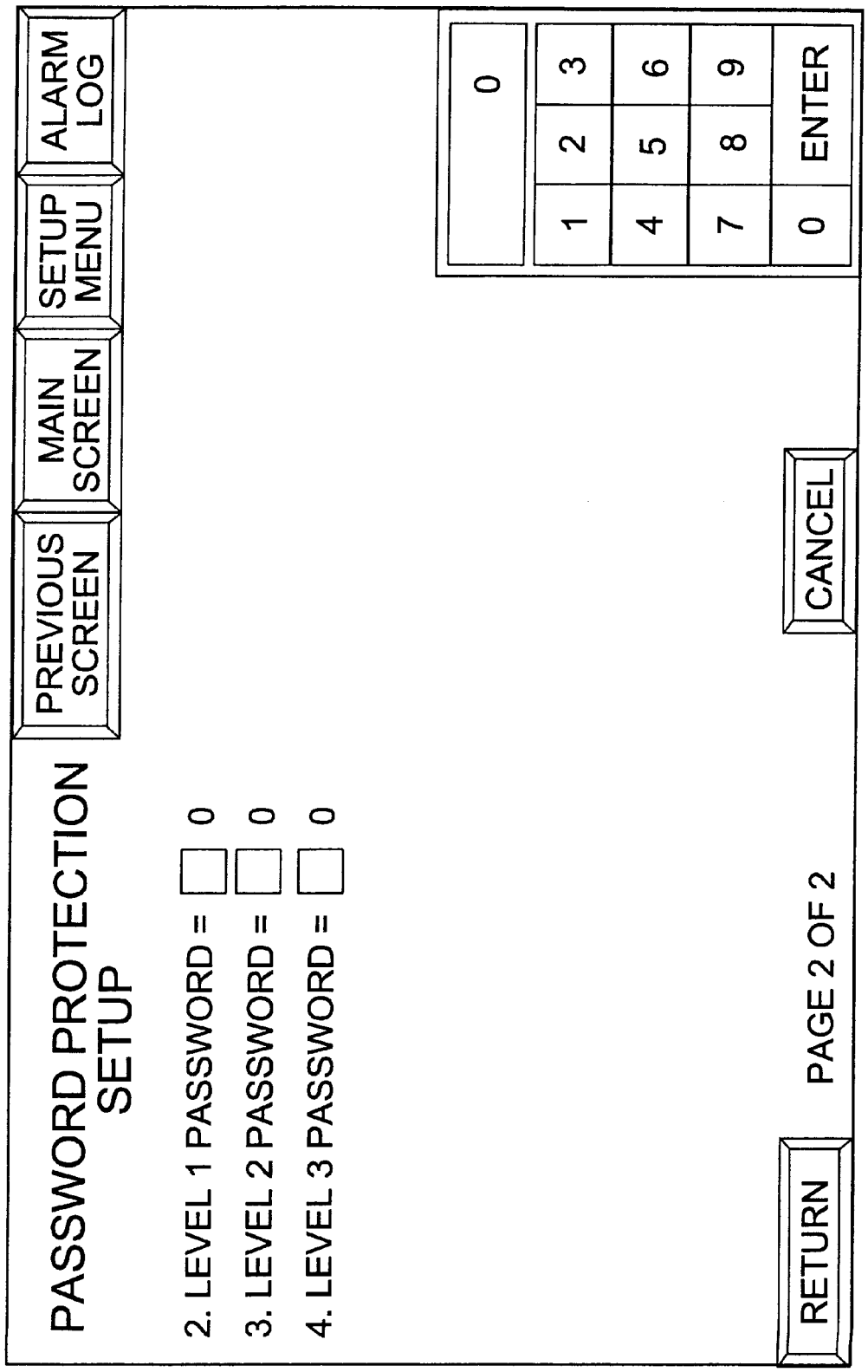
Figure 23:
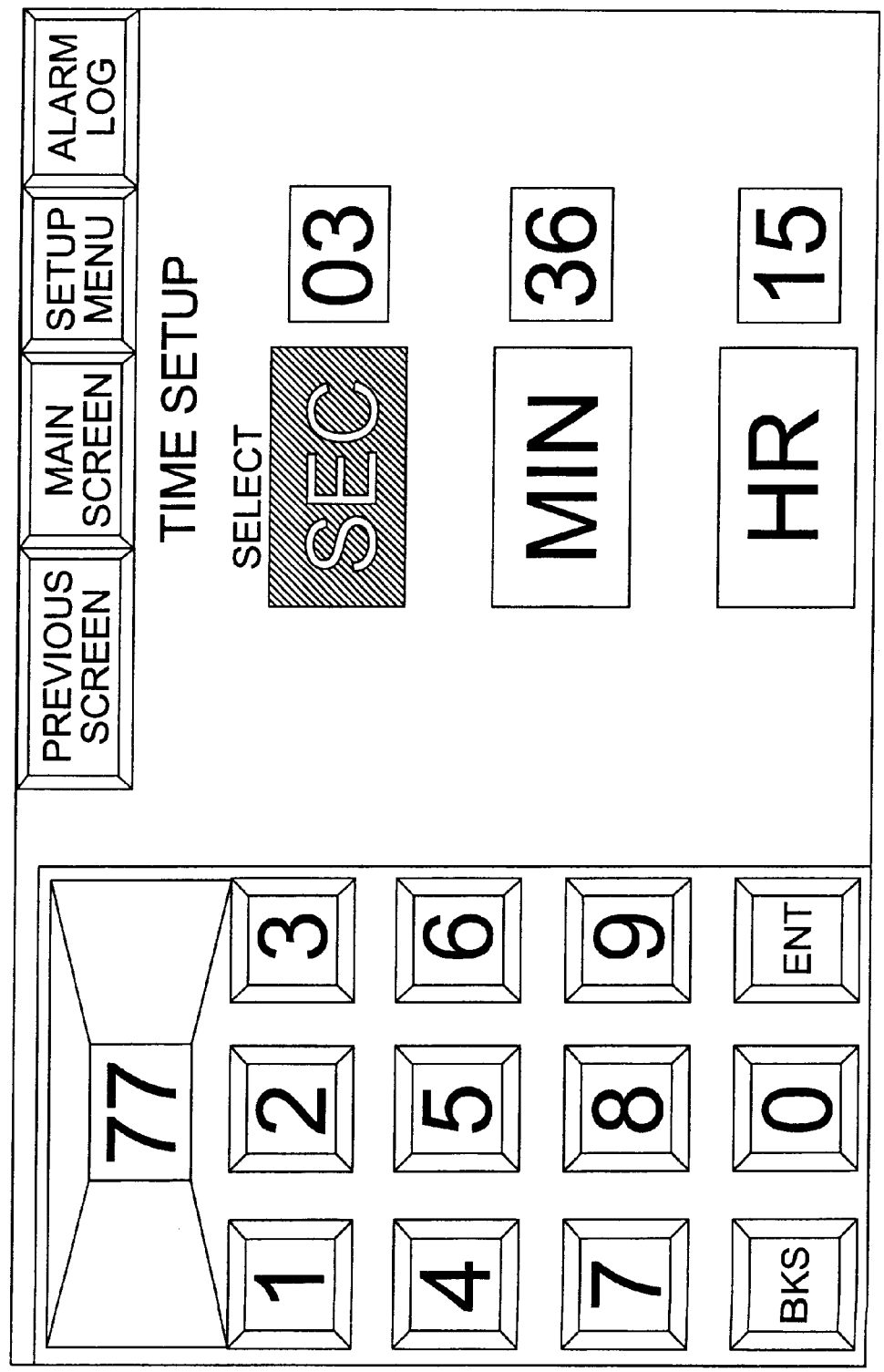
FIG. 23 illustrates the time setup screen.

The Password Protection Setup Screens (FIGS. 22a and 22b) establish the level of security desired to be assigned to each of the setup screens throughout the system. In the preferred embodiment, three levels of security are inherent in the system, and each screen can have a different security level or no security level at all. On FIG. 22b are the codes for each password security level assigned.

The Time Setup Screen (FIG. 23) sets the system time clock, with values for seconds, minutes, and hours entered via a keypad.

The Pump Alternation Setup Screen (FIG. 24) permits the operator to direct the scheme of the manual and automatic alternation between pumps. If manual alternation is selected, the pump configuration must be assigned (lead, lag). If automatic alternation is selected, a preset alternation sequence must be chosen from among the following options: at stop pump level, at time of day, every x hours, every x hours or stop pumps, and type of automatic alternation (first on, first off or last on, last off).

Returning to FIG. 6, the Pump Status Screen, there is shown the means to reconfigure the pump operation, which is utilized to satisfy the parameters calculated from optimization calculations, which will be discussed in the next section and are exemplified in FIGS. 26a and 26b.

As discussed above in the section on the monitoring aspect of the system, the cost parameter (i.e., CPMG) can be calculated from the real-time system data and displayed to the operator. In addition, there are provided means for calculating a potential optimized CPMG from the sensed parameters and the real-time CPMG. From these data, the computer can determine and display to the operator a recommended change in an operating parameter needed to achieve the optimized CPMG.

An example of how these potential optimization and resultant cost savings can be performed is illustrated in FIG. 26a, showing an exemplary wet well operated under constant speed or variable speed pumping. A summary of the formulas used for this calculation is given in FIG. 26b. These calculations provide the operator with a set of altered operating parameters for achieving optimization.

Variable-speed systems

For a given configuration of one or more pumps, there generally exists an optimum pumping speed or speeds that produce a minimum cost per output or maximum throughput efficiency. While specific control schemes vary, a common principle is that, for a given pump configuration:

1. The system should run no slower than the optimum speed(s);
2. Speed and outflow should increase above optimum only as needed to maintain the level below a preset maximum; and
3. If an alternative pump speed or combination of speeds can produce a higher or equal flow with lower cost per throughput (or higher throughput efficiency), then that alternative speed(s) should be activated.

The specific speed control sequences below each use data on the relationship between cost per output or throughput efficiency, pump speed(s), and outflow(s). These data can be measured by running the pump through a number of cycles at different speeds and calculating throughput efficiency or cost per throughput at each pump speed. This process can be manually or microprocessor controlled. Large parts of this curve are preferably measured at installation, and additional measurements can be made at later times to determine changes due to system degradation or changed external conditions. The curve can also be calculated using a theoretical or semiempirical model of the hydraulic system.

These data can then be used to identify global and local minima (maxima) of cost per throughput (throughput efficiency) versus speed and/or flow. Whatever the source of data on CPMG or throughput efficiency versus pump speed, various known search techniques can be applied to determine or update the optimum speed(s) or outflow(s) corresponding to global and local minimum CPMG or maximum throughput efficiency. The operating parameters for these optimum states are then stored in memory.

Single-pump, variable-speed system. A typical control sequence known in the art is given in FIG. 28. The "function of level" can be any function such that speed generally increases with level. Typically the increase is linear:

$$N=N_0+A(\text{level}-\text{pump stop level})$$

where N is the pump speed, $N_0$ is a preset minimum pump speed, and A is a constant chosen to make the pump reach 100% speed before overflow. As the level decreases, the pump speed typically drops to 10% or less before the pump is turned off. The pump start level is placed higher than the pump stop level to avoid rapidly and repeatedly cycling pump power.

Figure 28:
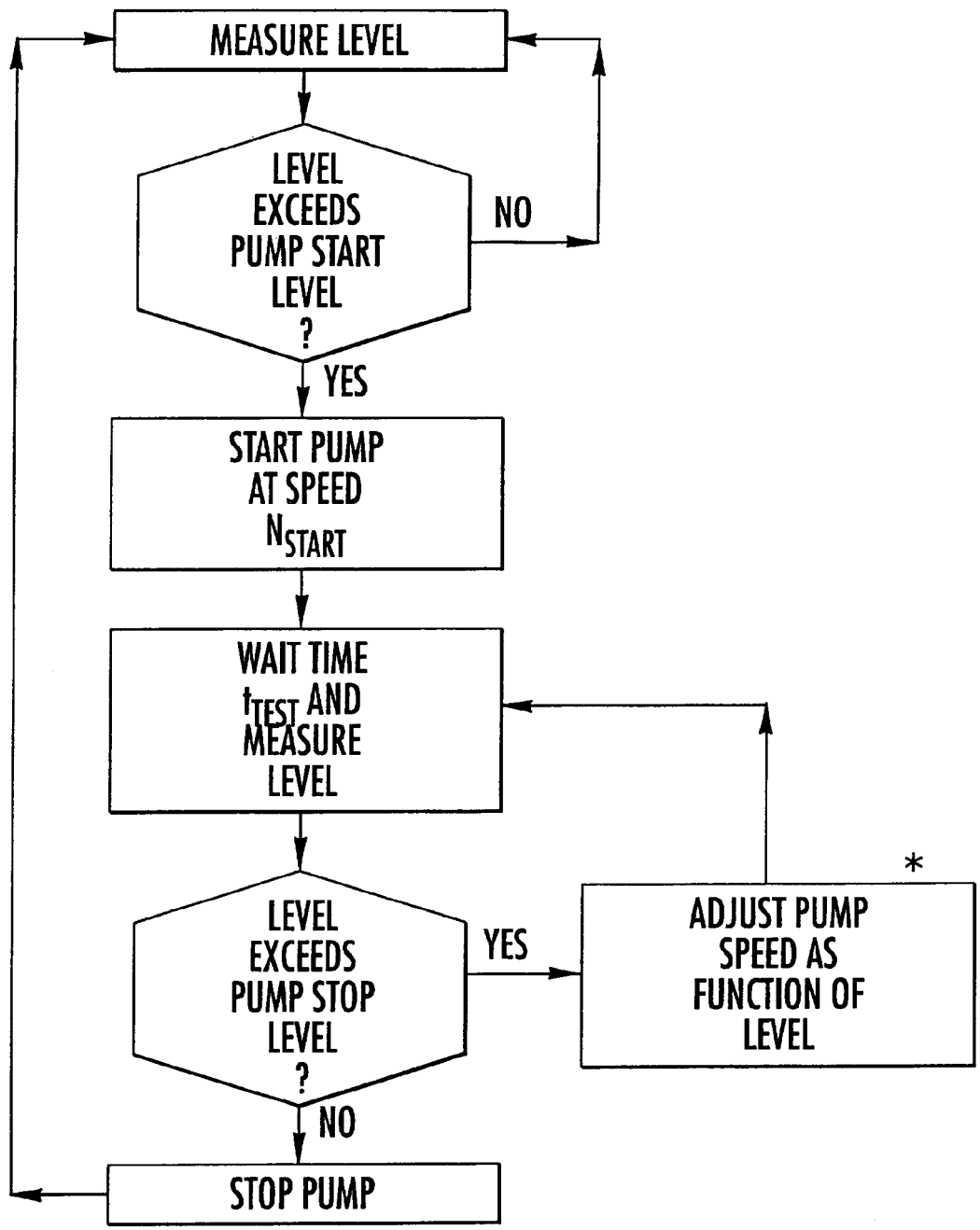
FIG. 28 is a flow chart for a pump operation control sequence.
Figure 29A:
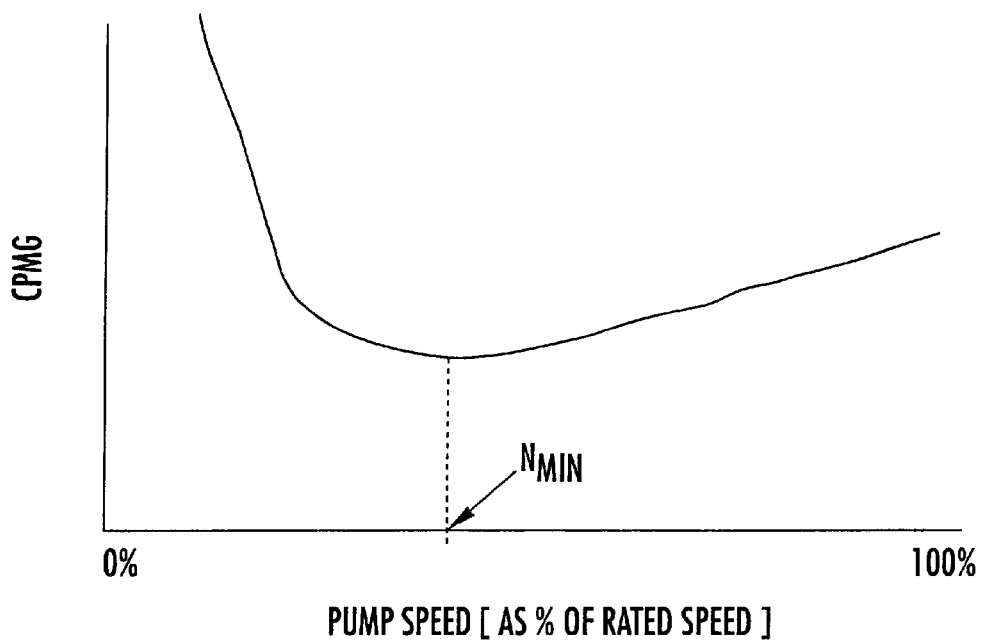
FIGS. 29a–29c plot a cost-per-throughput value versus pump speed for a single-pump variable-speed system.

The method of the present invention improves efficiency and costs by running the pump as much as possible at a speed corresponding to minimum cost per throughput or maximum throughput efficiency. For example, FIG. 29a shows a typical plot of CPMG versus speed for a single-pump system. The function of level does not permit $N<N_{min}$. Here the control sequence still follows FIG. 28, but uses a different relationship between speed and level:

$N=N_{min}$, level≦pump start level $N=N_{min}+A$(level−pump start level), level>pump start level Note that in practice the level is measured continuously, and the "measure level" steps in FIG. 28 indicate points where the most recent real-time measurement is used in the control sequence.

Figure 29B:
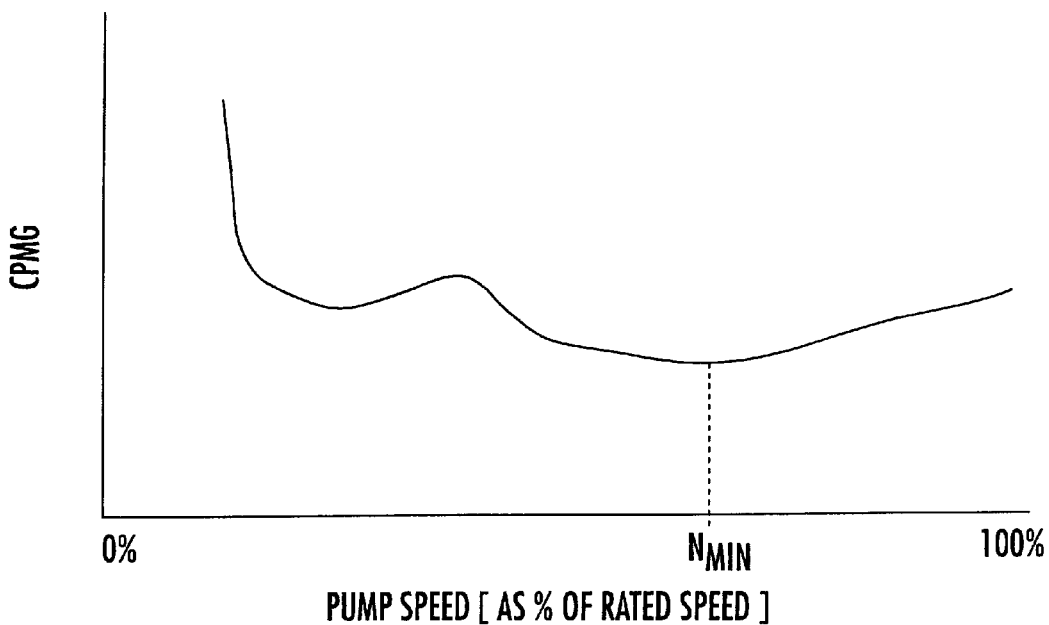
Figure 29C:
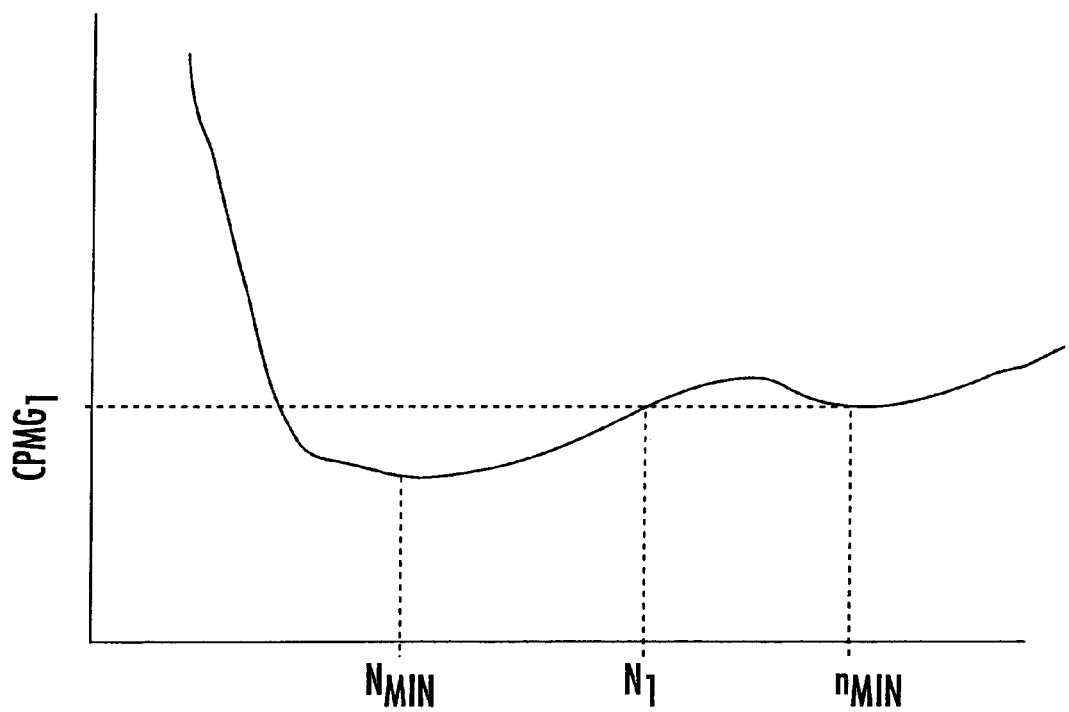

FIGS. 29b and 29c exemplify the case where CPMG versus speed has a secondary, local minimum in addition to a global minimum. In FIG. 29b the secondary minimum occurs at a speed<$N_{min}$, and the control method is unchanged. In FIG. 29c the secondary minimum occurs at $n_{min}>N_{min}$, and the control method should be modified to ensure that the system avoids speeds between $N_1$ and $n_{min}$, and instead lowers CPMG by switching to $n_{min}$. For example, the flow chart in FIG. 28 can still be used, but the "function of level" should become:

$N=N_{min}$, level≦pump start level $N=N_{min}+A_1$(level−pump start level), pump start level<level≦$L_1$ $N=n_{min}+A_2$(level−$L_1$), level>$L_1$ where $L_1$ is the level at which $N=N_1$ in the second equation on the right-hand side.

Multipump, variable-speed system. For optimal control in a multipump system, various operating parameters should be measured at a number of combinations of pump speeds. The control method preferably includes identifying combinations of pump speeds that have optimum efficiency—that is, identifying minima (maxima) on the multidimensional surface that describes cost per output (throughput efficiency) versus pump speed. Minima (maxima) including constraints such as a specific total outflow should also be identified. Various techniques known in the art can be used to identify extreme values on such a surface. Most such techniques benefit from using a good initial estimate of the extreme value's coordinates as a starting point for the search. For a given combination of steps, it has been found that the optimum efficiency point can be estimated as the point where each pump runs at the speed that would provide minimum cost per throughput or maximum throughput efficiency if that pump were running alone. In some cases identifying the extrema may require measurements at many different combinations of pump speeds, so that it may be impractical to make each measurement over an entire pumping cycle. In this case the preferred search technique may use some less accurate measurements made over portions of a cycle.

Figure 30A:
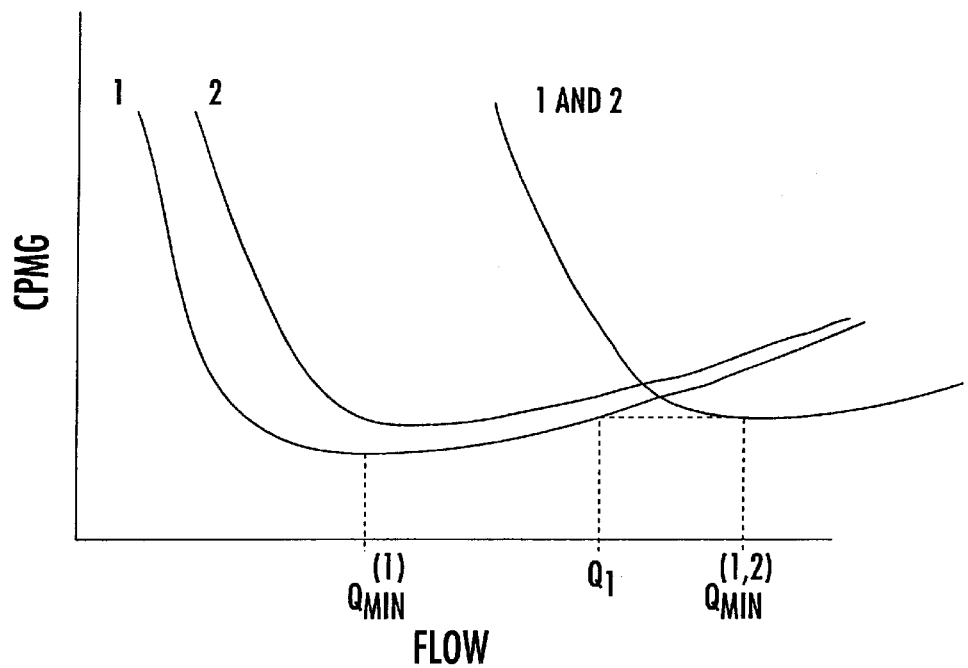
FIGS. 30a and 30b plot a cost-per-throughput value versus flow for a multipump system, each having three modes: (1) pump #1 alone; (2) pump #2 alone; and (3) pumps #1 and #2 simultaneously. The lower minimum cost figure belongs to (FIG. 30a) pump #1.
Figure 30B:
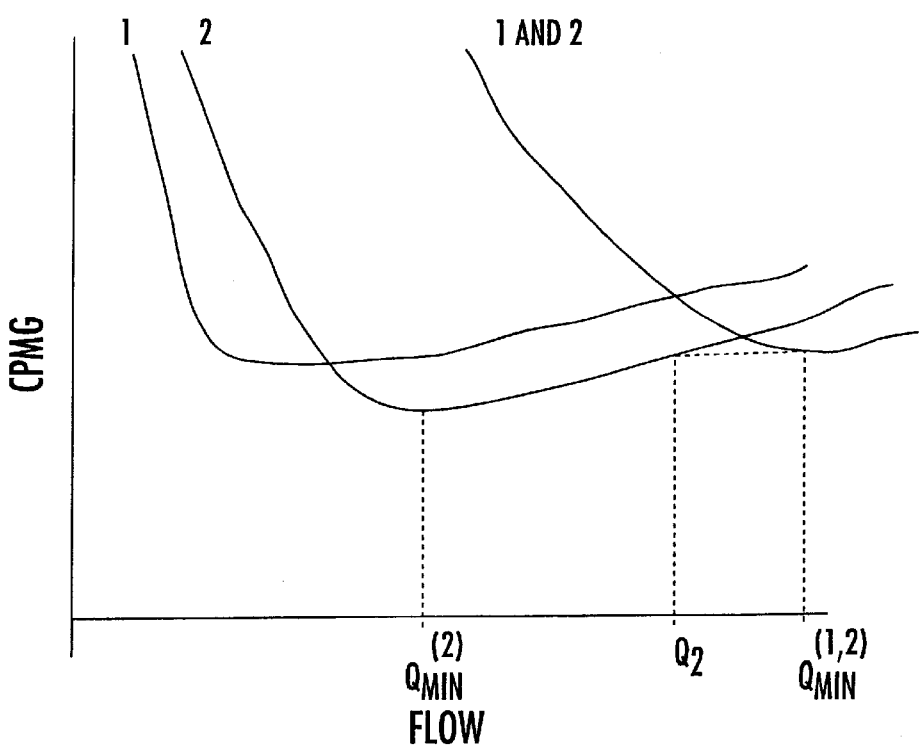
Figure 31:
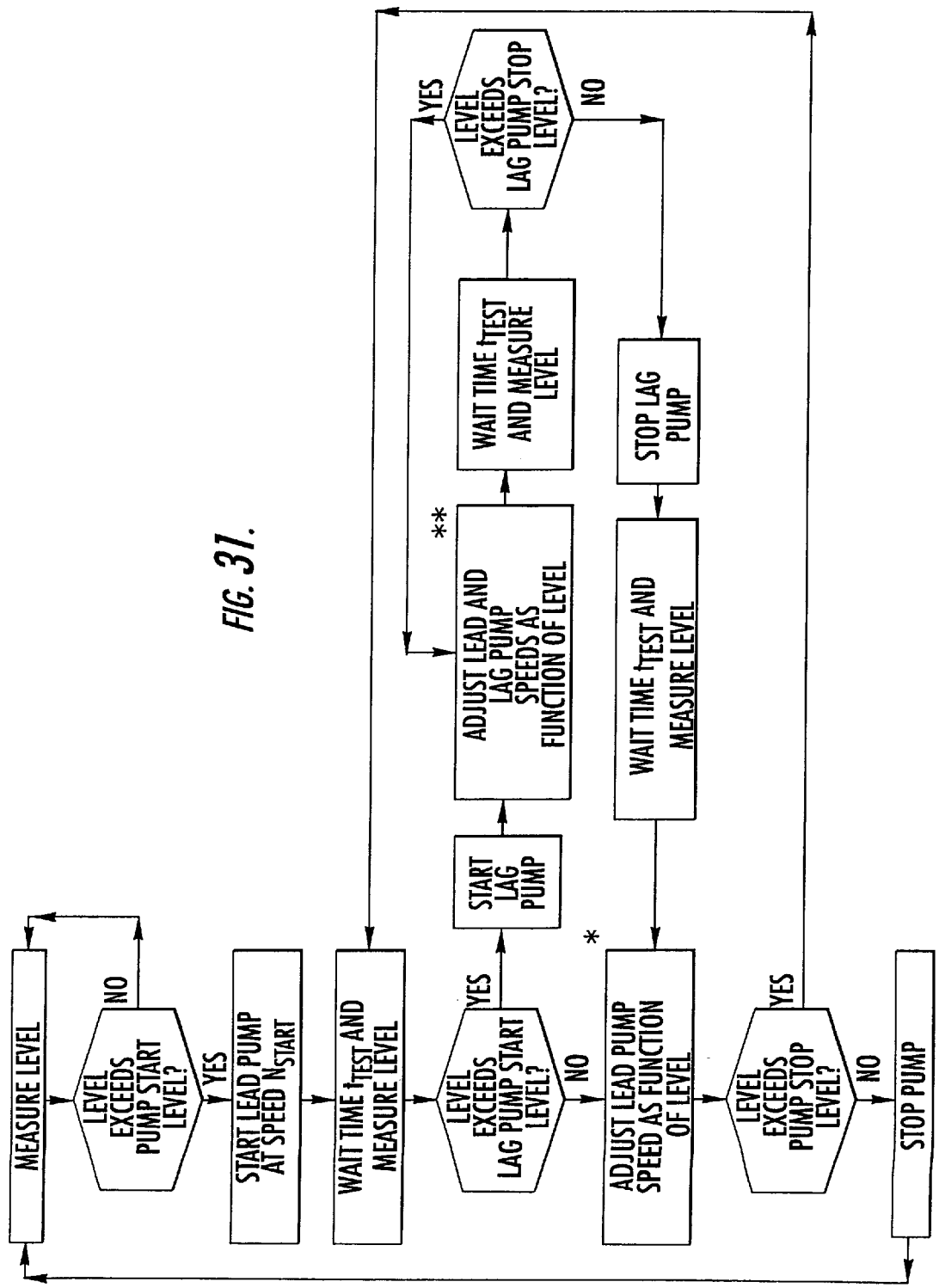
FIG. 31 is a flow chart of the control scheme for a multipump, variable-speed system.

FIGS. 30a,30b illustrates two scenarios for CPMG versus total flow for a two-pump system. Each plot shows CPMG versus total flow in three different modes: (1) pump #1 alone, (2) pump #2 alone, and (3) pumps #1 and #2 simultaneously. The curves for two-pump modes assume that the total flow has been apportioned between the pumps to maximize throughput efficiency or minimize cost per output at a given total flow. The optimum outflow is labeled $Q_{min}^{(1)}$ for pump #1 alone, $Q_{min}^{(2)}$ for pump #2 alone, and Q for pumps #1 and #2 operating simultaneously. Pumps #1 and #2 may be intrinsically different, or they may be originally identical pumps with different curves by virtue of different degradation or installation. For example, one pump in a two-pump system is typically installed farther from the main discharge, and therefore has a higher CPMG because of higher dynamic head. FIG. 31 shows the control scheme for this example.

FIG. 30a shows the case where the minimum CPMG of pump #1 is lower than that of pump #2, and that of the two-pump is intermediate between the two. Following the general principles outlined previously, there is no reason to operate pump #2 alone: pump #1 becomes the lead pump, and pump #2 (lag pump) is activated simultaneously if a higher outflow is required. The "function of level" (box with one asterisk) can be:

$N^{(1)}=N_{min}^{(1)}$, level≦lead pump start level $N^{(1)}=N_{min}^{(1)}+A_3$(level−lead pump start level), lead pump start level<level where $N_{min}^{(1)}$ is the speed at which pump #1 provides minimum CPMG and flow $Q_{min}^{(1)}$. When the requested flow exceeds $Q_1$, the system can lower its total CPMG by switching to two-pump mode. Therefore, the lag pump start level is chosen to correspond to the level at which the step indicated with one asterisk in FIG. 31 would begin to call for an outflow >$Q_1$. Then the "function of level" (box marked with two asterisks in FIG. 31) is determined by finding the combination of pump speeds $N^{(1)}$ and $N^{(2)}$ that provides the lowest CPMG at each total flow Q and maintains $Q≧Q_{min}^{(1,2)}$. For example, $Q=Q_{min}^{(1,2)}$, level≦lag pump start level $Q=Q_{min}^{(1,2)}+A_4$(level−lag pump start level), level>lag pump start level When the level begins to decrease, the system switches back to one-pump mode. The lag pump stop level is typically slightly lower than the lag pump start level to avoid rapidly cycling to pump off and on again.

In FIG. 30b the control scheme is similar, except that pump #2 becomes the lead pump. The "function" in the step marked with one asterisk in FIG. 31 is:

$N^{(2)}=N_{min}^{(2)}$, level≦lead pump start level $N^{(2)}=N_{min}^{(2)}+A_5$(level−lead pump start level), lead pump start level<level where $N_{min}^{(2)}$ is the speed at which pump #2 provides minimum CPMG and flow $Q_{min}^{(2)}$. In this case the lag pump start level is chosen to correspond to the level at which the step indicated in the asterisked box in FIG. 31 would begin to call for flow>$Q_2$.

Multipump, constant-speed system

Figure 25:
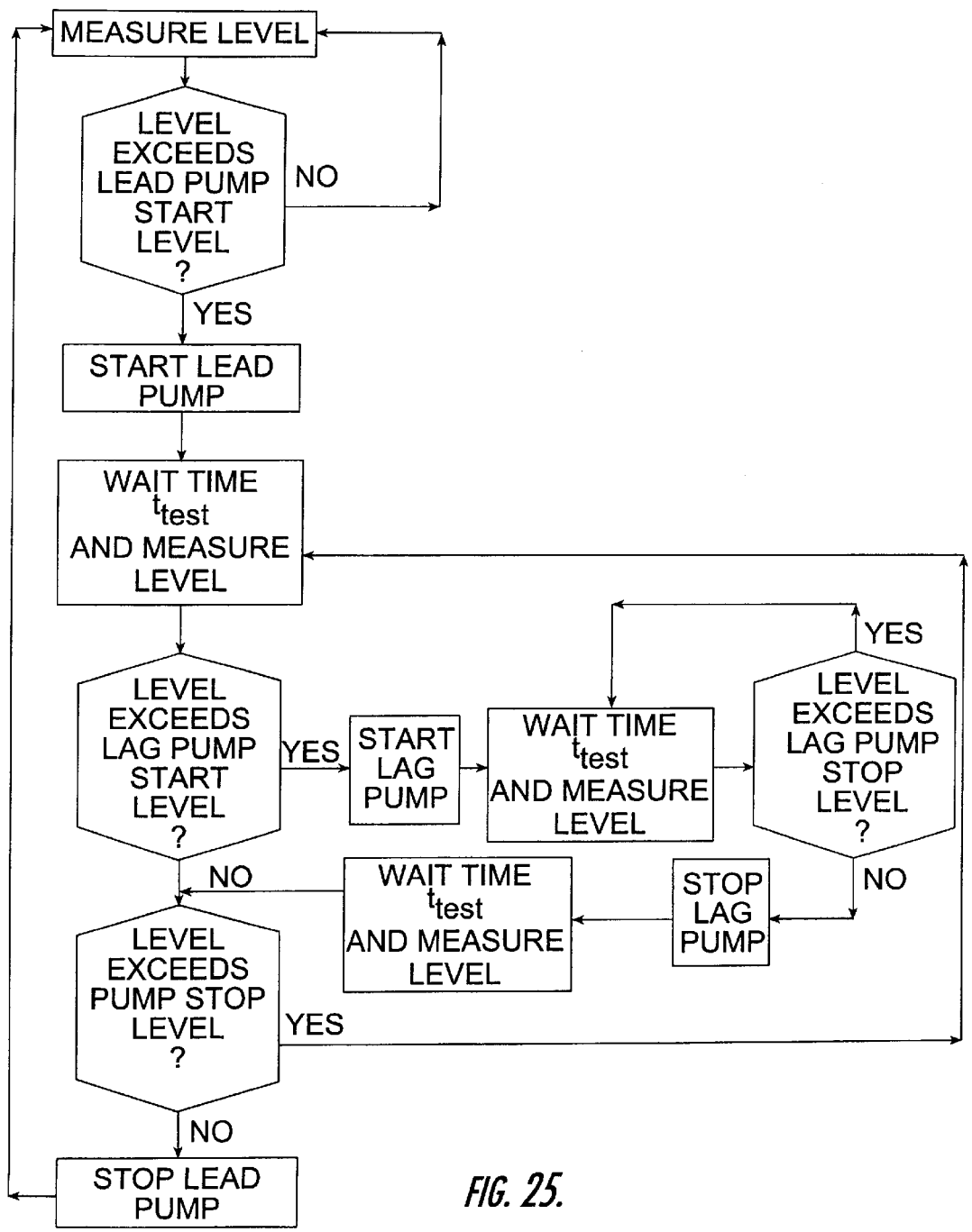
FIG. 25 is a flow chart of the control scheme for a multipump, constant-speed system.

In a constant-speed system, each operating mode has a single outflow and efficiency value. Even though pump speed cannot be varied, cost per output or throughput efficiency can still be used to control pump selection. Consider the example of a two-pump system. FIG. 25 shows an exemplary control scheme, with the lead pump assignment typically alternating between pump #1 and pump #2.

More efficient operation is achieved by assigning the lead pump to the pump that most recently had the highest efficiency or the lowest cost per throughput. For example, let $CPMG_1$ and $CPMG_2$ be the respective CPMG values of pump #1 and pump #2 alone. The system records and updates these quantities each appropriate pumping cycle. Then pump #1 becomes the lead pump whenever $CPMG_1 < CPMG_2$, and pump #2 becomes the lead pump whenever $CPMG_1 > CPMG_2$.

Under normal operation, in which CPMG increases over time due to standard component degradation, this method will roughly equalize the run time between pumps, since the less degraded pump will have the lower CPMG. If one pump suffers an unusual problem that causes a rapid CPMG increase that is unmatched by the other pump, then the method of the present invention will properly prefer the other pump until the problem is corrected. Moreover, the problem will be easily identifiable by the disparity in run times.

In many cases, and especially with constant-speed pumps, the control system does not include transducers for measuring pump motor power. In this case run time per quantity pumped can be used as an approximate efficiency parameter. This approximate efficiency parameter can be used for energy-efficient control, as described above.

In other cases, the system lacks means for calculating flow. In these cases, the elapsed running time of each pump can be measured and the pump with the lowest elapsed time or the highest flow can be assigned as the lead pump. This control method tends to increase energy efficiency, because the more efficient pump will generally empty the well faster and will therefore be activated more often when the system tries to equalize run time.

If lead pump assignment is controlled to equalize run time, additional information should be displayed to allow the operator to recognize pump degradation. For example, if outflow from each pump is recorded (excluding times when both pumps operate simultaneously), pump degradation will be indicated by a lower outflow. Alternatively, the number of starts and run time per start can be recorded (again excluding pump cycles in which both pumps operate simultaneously). Then pump degradation is indicated by a smaller number of starts or longer run time per start, without a need for flow measurement.

Advantages of CPMG over WTWE

Previous work has described both power ratio (such as WTWE) and throughput per energy efficiency parameters. Previous work, however, did not teach that the preferred parameter depends on the application. If the goal is to maintain a given flow rate, then either type of parameter can be effective. The energy-management aspects of this invention primarily address a different class of pumping applications, in which the goal is to maintain the quantity of fluid in a vessel within a predetermined range. For this large class of applications, throughput per energy and cost per throughput have previously unrecognized advantages.

CPMG is preferred for optimizing pumping speed and pump selection for efficiency. In a wastewater lift station, a critical task is to remove the inflow from the wet well before the wet well overflows. In a variable-speed system this task can be accomplished by running the pump fast for a short time, or slow for a longer time (as long as the outflow exceeds the time-average inflow). These two operating modes are compared in FIG. 26a. In this example the high-speed mode has a higher WTWE (55%) than the lower-speed mode (50%). However, because the high-speed mode produces excess dynamic head associated with its higher outflow rate, it consumes almost 7 times as much energy as the low-speed mode. The WTWE is high because it does not distinguish between useful and excess hydraulic output power related to excess dynamic head. CPMG, on the other hand, correctly identifies the energy and cost savings of the lower-speed operating mode. WTWE can be improved by subtracting the overpressure, as measured at the system's delivery outlet, from the pump discharge pressure. However, the excess discharge pressure generated by the pump may be considerably larger than the overpressure measured at the system outlet, because of pressure drops between the pump discharge and the system outlet. Moreover, this approach introduces additional measurement error, cost, and complexity by increasing the number of pressure transducers and associated measurement locations.

CPMG better characterizes overall system performance and is therefore preferred for identifying degradation of nonpump components or suboptimal interactions between pumps. WTWE has traditionally been used to characterize the efficiency of both pumps and pumping systems. CPMG, however, is more appropriate for characterizing overall system performance, because it is more sensitive to changes in the pump's hydraulic environment, that is, the inflows, valves, pipeline networks, and other pumps connected to a given pump. For example, a partially blocked output pipeline will reduce the outflow at a given pump speed, but also will increase the head pressure. Likewise, a second pump using the same output pipeline will increase head pressure and reduce flow through the first pump at a given pumping speed. CPMG will clearly increase in either case since the pump must now do extra work to pump the same volume of material.

WTWE, on the other hand, measures the product of head pressure and outflow, and therefore it may change relatively little in either example; in some cases it may even increase. WTWE in some cases is preferred for characterizing pumps alone, as in this example where the pump continues to function properly even as changes in its hydraulic environment raise the overall energy costs.

CPMG is preferred for predicting operating costs for future or hypothetical system operating modes, configurations, and time periods. Having a reliable projected operating cost is advantageous for designing, modifying, operating, and maintaining pump systems cost effectively. In many applications, including wastewater lift stations, material throughput rate is a relatively constant operating specification, or is at least the most predictable system requirement. In these cases the preferred method for calculating predicted operating costs is:

$$\text{Projected cost} = CPMG \times \text{projected average throughput rate} \times \text{time}$$

Hydraulic power output, in these cases, is not directly specified, but takes on whatever value is required to provide the necessary throughput. Therefore, there is no equally reliable method for using WTWE to calculate projected cost.

All the advantages described above hold for any cost per throughput or throughput per energy parameter, including parameters that do not fall under the rigid definitions given. While these definitions include the most preferred embodiments, any parameter with monotonic functional dependence on cost per throughput or throughput per energy within a given operating range will provide similar advantages. One example of such a parameter is a monotonic polynomial function of CPMG.

More generally, if a parameter P' and a given cost per throughput or throughput per energy parameter P both depend in part on a common set of system parameters $\{q_i\}$ within a certain range $D(\{q_i\})$, then P' will provide similar advantages over any range that is a subset of D and within which P' and P increase and decrease substantially together, and particularly f relative extrema of P' and P occur in approximately the same regions of D.

It may be appreciated by one skilled in the art that additional embodiments may be contemplated, including, but not limited to, monitoring and control systems for other pumping operations such as water supply, oil and gas wells and pipelines, and liquid treatment or manufacturing plants.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for simulating a pump station status and for controlling the pump station, the pump station containing a pump for pumping fluid from a well, the system comprising:
   a processor having control software resident therein for effecting automatic control of a system parameter of the pump station responsive to a fluid level in the well;
   means for inputting a simulated fluid level within a well into the processor;
   means for calculating a real-time cost parameter of the system based upon a pump flow rate and a pump power usage;
   simulation software means resident in the processor and in communication with the control software, responsive to the simulated fluid level and the real-time cost parameter, for simulating an automatic control of the system parameter; and
   means for displaying the simulated automatic control of the system parameter.

2. A system for predicting a failure of an element of a pump station containing a pump for pumping fluid from a well and a motor coupled to the pump, the system comprising:
   means for sensing a plurality of operating parameters of the pump station, including means for sensing an energy usage of the pump, comprising a second transducer adapted to provide a signal proportional to an electrical power consumed by the motor, and means for sensing a quantity of fluid pumped per unit time, comprising a first transducer adapted to provide a signal proportional to a flow of fluid at an outlet of the pump;
   means in communication with the sensing means for transmitting the operating parameters to an operator in real time;
   means in communication with the sensing means for storing the sensed operating parameters at predetermined time intervals over a predetermined period of time;
   means in communication with the storing means for comparing a sensed operating parameter with a predetermined derived operating parameter;
   means for predicting from the comparing means if a failure of a pump station element is likely;
   means in communication with the storing means for displaying a time history of at least one of the stored operating parameters;
   means in communication with the sensing means for calculating and for displaying a real-time cost parameter of the system, wherein the real-time cost parameter comprises the energy usage per quantity of fluid pumped;
   means for calculating a throughput efficiency comprising:

$$\frac{\sum_i^N Q_i}{\sum_i^N P_i}$$

where $Q_i$ is the flow at a time point i and $P_i$ the consumed power at time point i; and
   means for calculating a potential optimized efficiency from the sensed parameters and the real-time efficiency.

3. The system recited in claim 2, wherein a pump failure is predictable by an increase in the real-time cost parameter.

4. The system recited in claim 3, further comprising means for taking a pump offline if the real-time cost parameter is found to increase above a predetermined value.

5. The system recited in claim 4, wherein the pump comprises a first pump, and further comprising a second pump and means for placing the second pump in a lead position upon taking the first pump offline.

6. The system recited in claim 2, wherein the pump motor is adapted to run the pump at a variable speed, and further comprising means for optimizing efficiency by varying the pump speed.

7. The system recited in claim 2, wherein the pump comprises a first pump, and further comprising:
   a second pump, both pumps adapted to operate at a constant speed;
   means for detecting an efficiency of the first and the second pump; and
   means for remotely configuring the first and the second pump to place a pump having a higher efficiency into a lead position in order to optimize an efficiency of the system.

8. The system recited in claim 7, wherein the detecting means comprises means for detecting the efficiency of the first and the second pumps at a series of predetermined intervals, and wherein the configuring means comprises means for reconfiguring the first and the second pump upon a lead pump being detected to have a lower efficiency than a lag pump.

* * * * *